(12) United States Patent
Hakamata et al.

(10) Patent No.: US 10,514,871 B2
(45) Date of Patent: Dec. 24, 2019

(54) PRINT MANAGEMENT METHOD AND PRINT MANAGEMENT APPARATUS

(71) Applicant: FUJITSU LIMITED, Kawasaki-shi, Kanagawa (JP)

(72) Inventors: Junki Hakamata, Yokohama (JP); Tetsuhiro Yamaguchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/928,815

(22) Filed: Mar. 22, 2018

(65) Prior Publication Data
US 2018/0293032 A1 Oct. 11, 2018

(30) Foreign Application Priority Data
Apr. 5, 2017 (JP) .................. 2017-075063

(51) Int. Cl.
*G06F 3/12* (2006.01)

(52) U.S. Cl.
CPC .......... *G06F 3/1206* (2013.01); *G06F 3/1267* (2013.01); *G06F 3/1273* (2013.01); *G06F 3/1285* (2013.01); *G06F 3/1288* (2013.01); *G06F 3/1226* (2013.01); *G06F 3/1253* (2013.01)

(58) Field of Classification Search
CPC .................................... G06F 3/1206
USPC ........................................ 358/1.15
See application file for complete search history.

(56) References Cited

U.S. PATENT DOCUMENTS

| | | |
|---|---|---|
| 2009/0213411 A1 | 8/2009 | Fukumi |
| 2010/0118340 A1* | 5/2010 | Yamada ................ G06F 3/1204 358/1.15 |
| 2010/0134818 A1 | 6/2010 | Minamizono et al. |
| 2017/0192727 A1* | 7/2017 | Yun ........................ G06F 3/1211 |
| 2017/0295285 A1* | 10/2017 | Yoshida ............... H04N 1/0023 |
| 2018/0196625 A1* | 7/2018 | Nakatani ............... G06F 3/1213 |
| 2018/0293033 A1* | 10/2018 | Yamaguchi ............. G06F 3/126 |

FOREIGN PATENT DOCUMENTS

| | | |
|---|---|---|
| JP | 2009-205266 | 9/2009 |
| JP | 2009-223671 | 10/2009 |
| JP | 2013-29955 | 2/2013 |
| JP | 2013-105417 | 5/2013 |
| JP | Z015-53072 | 3/2015 |

* cited by examiner

*Primary Examiner* — Jacky X Zheng
(74) *Attorney, Agent, or Firm* — Fujitsu Patent Center

(57) ABSTRACT

A print management apparatus includes a memory and a processor configured to receive print data and first attribute information of the print data from a terminal, perform a determination of a first printer as an output destination candidate from among a plurality of printers in accordance with setting information and the first attribute information, generate first print data adapted to the first printer based on the print data before an output instruction is received from the first printer, and when the output instruction is received from the first printer, transmit first output data to the first printer based on the first print data, and when an output instruction is received from a second printer, generate second print data adapted to the second printer based on the print data, and transmit second output data to the second printer based on the second print data.

19 Claims, 21 Drawing Sheets

FIG. 5

MENU SCREEN | | | | | UserA [LOG-OUT]

| DOCUMENT NAME | DATE/TIME | PAGE | NUMBER OF COPIES | SETTING |
|---|---|---|---|---|
| TEST PAGE 1 | 2016/01/10 15:00 | 1 | 1 | SINGLE-SIDED/ COLOR/2up |
| TEST PAGE 2 | 2016/01/10 15:03 | 1 | 1 | DOUBLE-SIDED/ MONOCHROME/1up |
| PAYCHECK JANUARY | 2016/01/11 13:20 | 2 | 1 | SINGLE-SIDED/ MONOCHROME/1up |
| CONFERENCE MATERIAL | 2016/01/13 09:26 | 4 | 4 | DOUBLE-SIDED/ COLOR/2up |

[SELECT ALL]  [DETAILS]  [DELETE]  [PRINT]

FIG. 6

| USER ID | REGULAR PRINTER NAME |
|---------|----------------------|
| UserA   | Printer03            |
| UserB   | Printer02            |
| . . .   | . . .                |

FIG. 7

| USER ID | REGULAR PRINTER NAME |
|---------|----------------------|
| UserA   | Printer01, Printer03 |
| UserB   | Printer02, Printer03 |
| . . .   | . . .                |

FIG. 8A

| USER ID | GROUP NAME |
|---|---|
| UserA | FIRST SALES DIVISION |
| UserB | SECOND SALES DIVISION |
| . . . | . . . |

FIG. 8B

| GROUP NAME | REGULAR PRINTER NAME |
|---|---|
| FIRST SALES DIVISION | Printer01 |
| SECOND SALES DIVISION | Printer02 |
| . . . | . . . |

FIG. 9

| PRINT DATE/ TIME | USER ID | OUTPUT PRINTER NAME | JOB ID | IP ADDRESS | TERMINAL ID | ... |
|---|---|---|---|---|---|---|
| 2016/01/07 09:15:11, | UserA, | Printer01, | Job00001, | 123.45.67.89, | CP0001, | ... |
| 2016/01/07 10:03:20, | UserB, | Printer02, | Job00002, | 123.45.67.89, | CP0001, | ... |
| 2016/01/07 13:09:22, | UserA, | Printer03, | Job00003, | 111.23.45.67, | CP0002, | ... |
| 2016/01/07 13:11:10, | UserA, | Printer03, | Job00004, | 111.23.45.67, | CP0002, | ... |

FIG. 10

| JOB ID | PRINTER NAME | CACHE DELETION DEADLINE | CACHE STORAGE PLACE |
|---|---|---|---|
| Job00001 | Printer01 | 2016/01/10 12:15 | /cache/job00001.xps |
| Job00002 | NULL | NULL | NULL |
| Job00003 | Printer02 | 2016/01/11 23:00 | /cache/job00003a.xps |
| Job00003 | Printer03 | 2016/01/11 23:00 | /cache/job00003b.xps |
| ... | | | ... |

PRINT MANAGEMENT METHOD AND PRINT MANAGEMENT APPARATUS

CROSS-REFERENCE TO RELATED APPLICATION

This application is based upon and claims the benefit of priority of the prior Japanese Patent Application No. 2017-75063, filed on Apr. 5, 2017, the entire contents of which are incorporated herein by reference.

FIELD

The embodiments discussed herein are related to a print management technique.

BACKGROUND

A printing system is used, in which print instruction data is transmitted from a terminal to a server which is accessible from multiple printers, according to data selection from an output printer, print data is transmitted to the printer from the server, and print output is performed via the printer. In the above-mentioned printing system, it is possible to perform printing without specifying a printer that performs print output in advance.

Related techniques are disclosed in, for instance, Japanese Laid-open Patent Publication Nos. 2009-223671, 2013-029955, 2015-053072, 2009-205266, and 2013-105417.

SUMMARY

According to an aspect of the invention, a print management apparatus includes a memory and a processor configured to receive print data and first attribute information of the print data from a terminal, perform a determination of a first printer as an output destination candidate from among a plurality of printers in accordance with setting information and the first attribute information, generate first print data adapted to the first printer based on the print data before an output instruction is received from the first printer, and when the output instruction is received from the first printer, transmit first output data to the first printer based on the first print data, and when an output instruction is received from a second printer, generate second print data adapted to the second printer based on the print data, and transmit second output data to the second printer based on the second print data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example job menu screen of a printer;

FIG. 6 is a diagram illustrating a first example of setting information;

FIG. 7 is a diagram illustrating a second example of setting information;

FIGS. 8A and 8B are diagrams illustrating a third example of setting information;

FIG. 9 is a diagram illustrating an example print output log;

FIG. 10 is a diagram illustrating an example of cache management information;

DESCRIPTION OF EMBODIMENTS

In related art, when a print instruction data transmitted from a terminal to a server corresponds to multiple printers, after a user gives an instruction to a printer at an output destination, the server converts the printer instruction data into a format corresponding to the printer at an output destination. In this case, print output is delayed due to a time taken for the conversion.

<Example of Entire Configuration of System of Embodiment>

Figure 1:
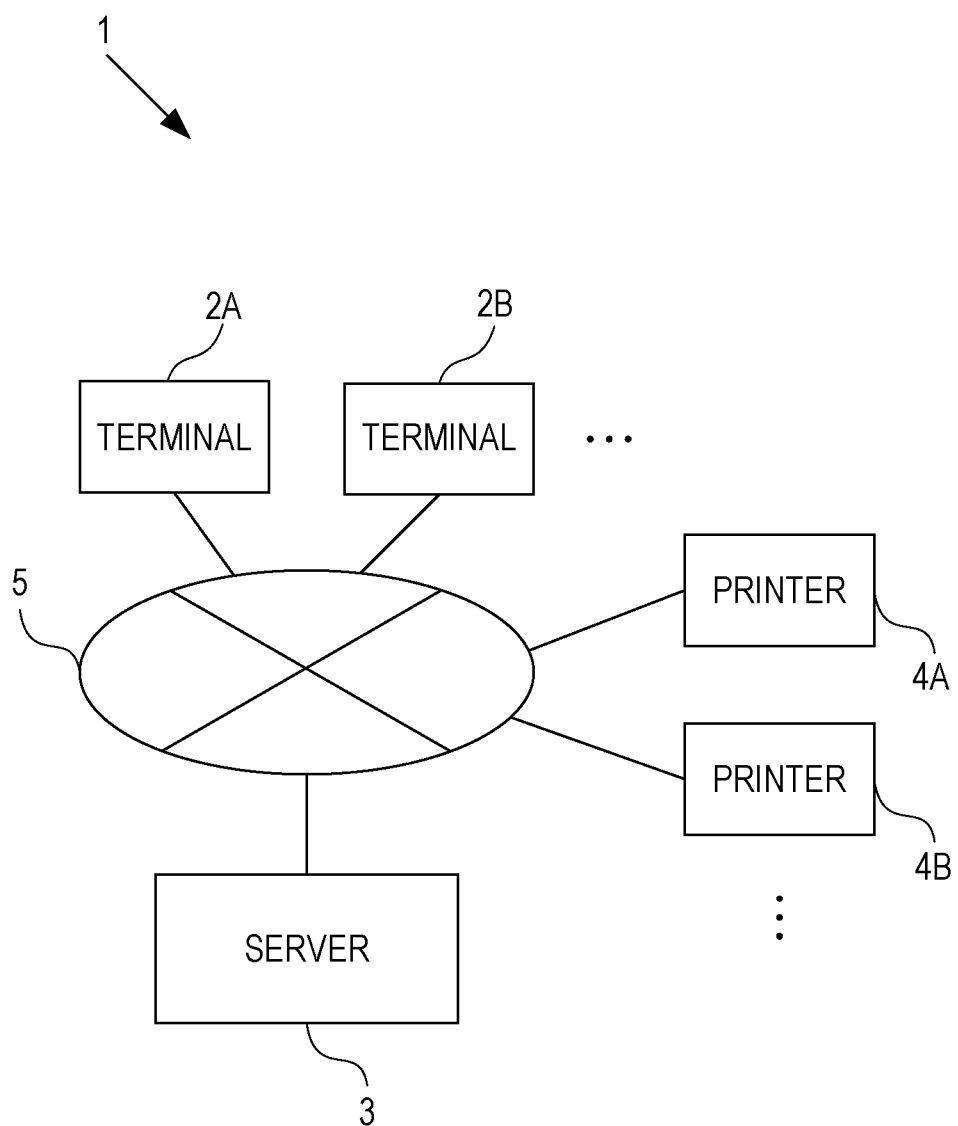
FIG. 1 is a diagram illustrating an example print output system of an embodiment.

FIG. 1 illustrates an example print output system of an embodiment. In a print output system 1, multiple terminals 2 (2A, 2B, . . . ), a server 3, and multiple printers 4 (4A, 4B, . . . ) are connected via a network 5. The number of terminals 2 connected to the network 5 may be one.

Upon receiving a printer instruction operation from a user, the terminal 2 generates intermediate format data for causing the printer 4 to execute predetermined printing. The terminal 2 then transmits print job data including attribute information and intermediate format data to the server 3.

The attribute information includes either one of or both of identification information of a user who has performed a print instruction operation, and identification information of the terminal 2. The identification information of a user is, for instance, user identification (ID). The identification information of the terminal 2 is, for instance, terminal ID.

The intermediate format data may be, for instance, XML paper specification (XPS) based on extensible markup language (XML). The intermediate format data is versatile print data which may be interpreted by multiple types of printer 4. The intermediate format data is an example of print instruction data.

The terminal 2 is a predetermined computer. For instance, the terminal 2 may be a personal computer, a tablet terminal, or a smartphone.

The server 3 manages multiple printers 4 connected to the network 5. The server 3 receives print job data transmitted from the terminal 2, and transmits the intermediate format data to the printer 4 at a print output destination. The server 3 may convert the intermediate format data into print format data, and may transmit the print format data to the printer 4 at a print output destination.

The print format data is print data adapted to the printer 4 at a print output destination (hereinafter may be referred to as an output destination). In other words, the print format data is data in a format that allows the printer 4 at an output destination to print the data without converting the format. The print format data may be, for instance, page description language (PDL).

The printer 4 may be a printer specialized in printing function, or may be a multifunctional device having a facsimile function and a copy function in addition to the printing function.

In the embodiment, multiple types of printers 4 are to be connected to the network 5. For instance, printers 4 with different vendors (supply sources) or models are to be connected to the network 5. The network 5 in the embodiment is, for instance, the Internet network. Alternatively, the network 5 may be an internal network, such as a local area network (LAN).

<Example of Terminal>

Figure 2:
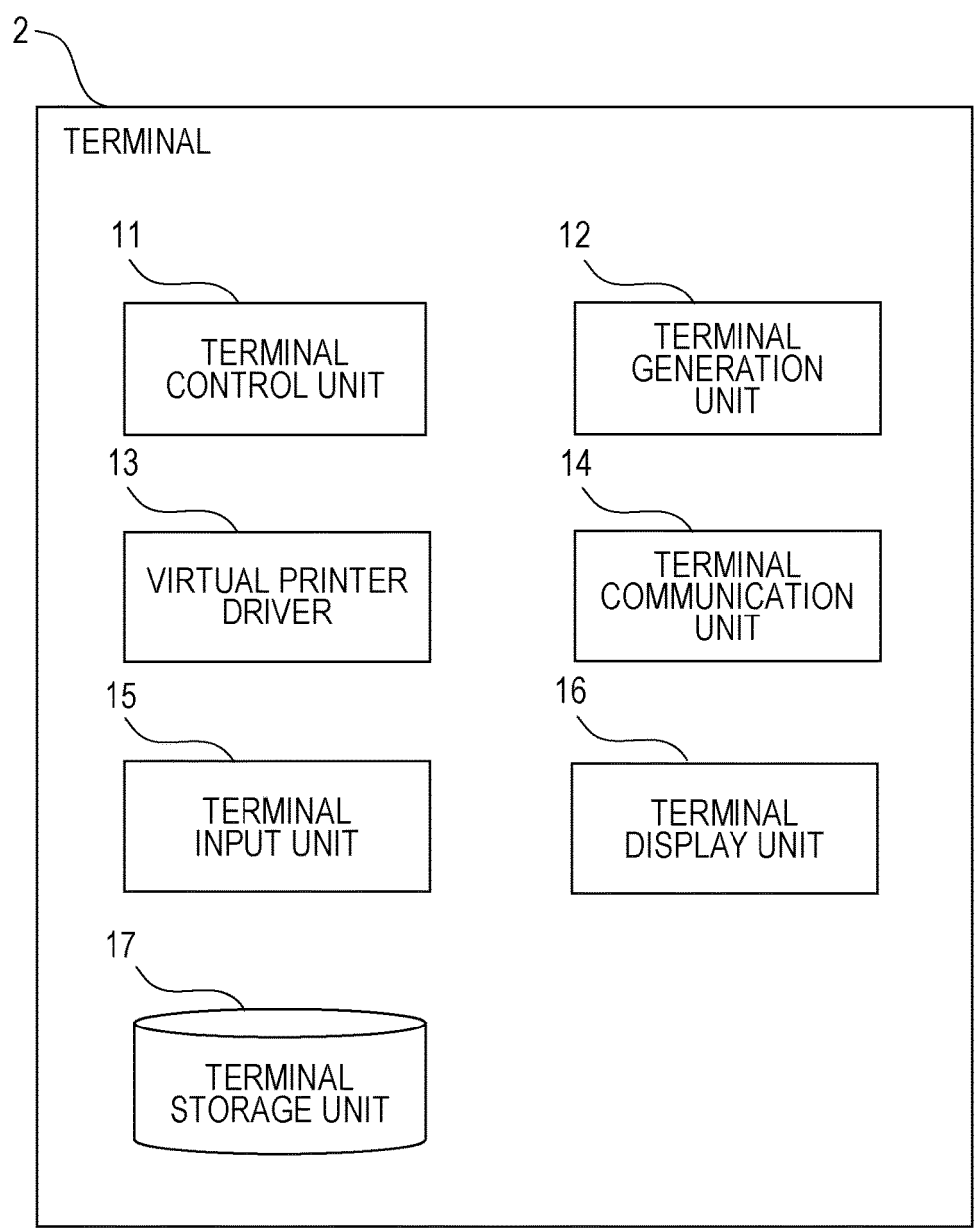
FIG. 2 is a diagram illustrating an example terminal.

FIG. 2 illustrates an example terminal. The terminal 2 includes a terminal control unit 11, a terminal generation unit 12, a virtual print driver 13, a terminal communication unit 14, a terminal input unit 15, a terminal display unit 16, and a terminal storage unit 17.

The terminal control unit 11 performs various types of control on the terminal 2. The terminal generation unit 12 generates print data based on a print instruction operation from a user. For instance, the print data is document data or image data generated by a predetermined application program (hereinafter referred to as software) executed by the terminal 2.

The virtual print driver 13 generates intermediate format data compatible with multiple printers 4 from the print data generated by the terminal generation unit 12. For instance, the virtual print driver 13 is utilized by the above-mentioned print function of the software.

The terminal communication unit 14 communicates with the server 3 via the network 5. The terminal communication unit 14 transmits print job data including attribute information and intermediate format data to the server 3. The print job data may include, for instance, various types of information (meta information) on printing, such as a print time. Specifically, the meta information may include a document name, time/time of a print instruction operation, a page number, number of copies, and print settings.

The terminal input unit 15 is an input unit for performing a predetermined input to the terminal 2. For instance, the terminal input units 15 may be a keyboard or a mouse.

The terminal display unit 16 is a display that displays predetermined information. For instance, the terminal display unit 16 may be a display or the like. The terminal input unit 15 and the terminal display unit 16 may be an integrated touch panel display. The terminal storage unit 17 stores predetermined information.

<Example of Server in First Embodiment>

Figure 3:
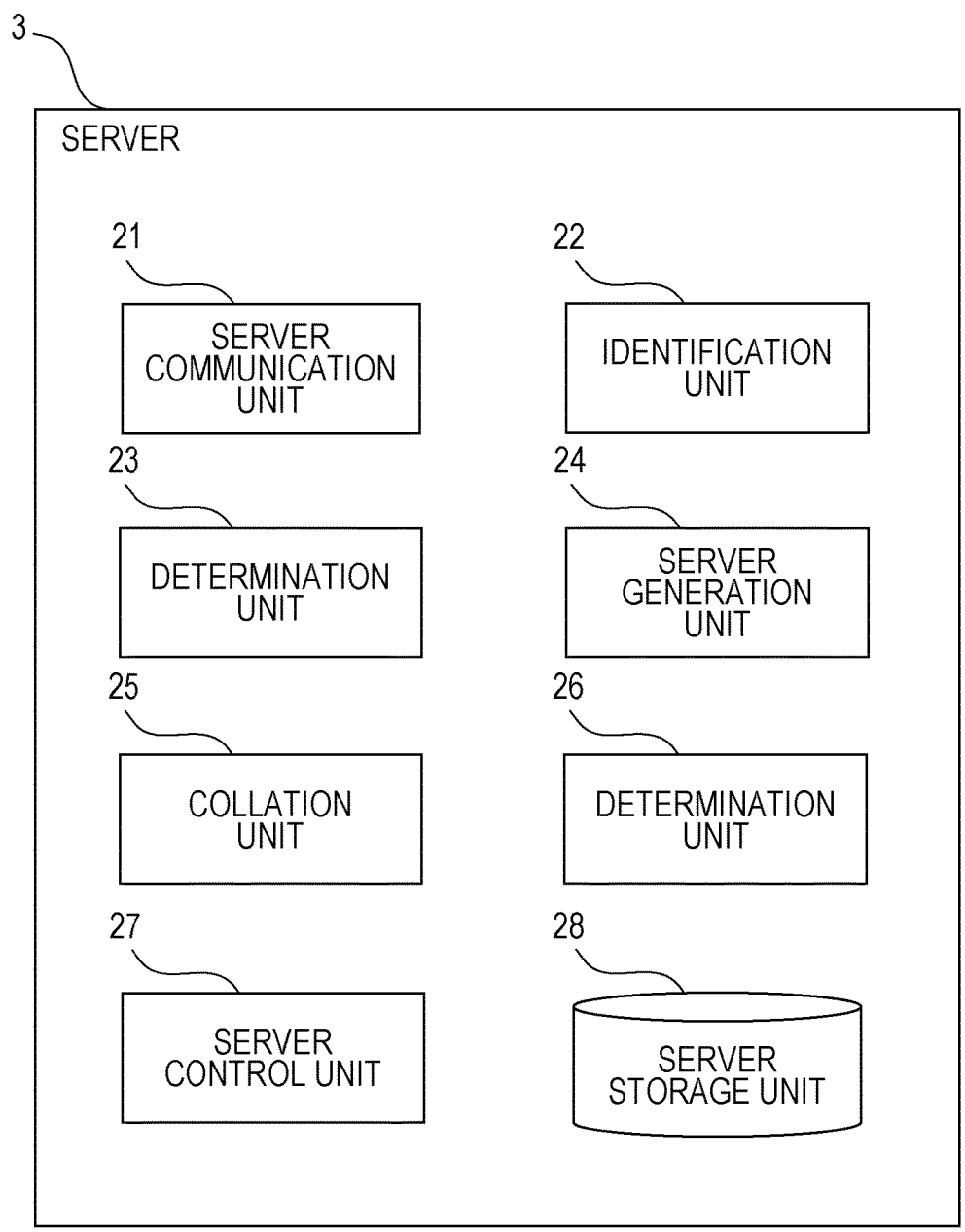
FIG. 3 is a diagram illustrating an example server in a first embodiment.

FIG. 3 illustrates an example server in the first embodiment. The server 3 includes a server communication unit 21, an identification unit 22, a determination unit 23, a server generation unit 24, a collation unit 25, a determination unit 26, a server control unit 27, and a server storage unit 28.

The server communication unit 21 receives from the terminal 2 intermediate format data in formats compatible with the multiple printers 4, and print job data including attribute information on the intermediate format data. The print job data received from the terminal 2 is stored in the server storage unit 28. The server communication unit 21 is an example of a receiving unit and a transmitting unit.

The identification unit 22 identifies an output candidate printer as a first printer based on the attribute information received from the terminal 2 and setting information stored in the server storage unit 28. The setting information indicates an output candidate printer corresponding to the attribute information, and is pre-stored in the server storage unit 28 by the later-described processing of the determination unit 26. Hereinafter, the output candidate printer may be referred to as the regular printer.

The determination unit 23 determines whether the intermediate format data received from the terminal 2 is adapted to the regular printer. When the intermediate format data is adapted to the regular printer, the server control unit 27 stores the intermediate format data in the server storage unit 28.

When the intermediate format data received from the terminal 2 is not adapted to the regular printer, the server generation unit 24 converts the intermediate format data to generate first print instruction data adapted to the first printer identified by the identification unit 22, and stores the first print instruction data in the server storage unit 28. In this embodiment, the first print instruction data is intermediate format data (first intermediate format data). The server generation unit 24 is an example of a generation unit.

In other words, regardless of whether or not the intermediate format data received from the terminal 2 is adapted to the first printer, intermediate format data in a format adapted to the first printer is stored in the server storage unit 28. The intermediate format data in a format adapted to the first printer is stored, for instance, in a predetermined region different from a region in which print job data is stored at the time of reception from the terminal 2. The predetermined region may be referred to as a cache region.

Various print settings are included in the intermediate format data. When the types of printer 4 are different, pieces of intermediate format data that may be interpreted by the respective types may be different. For instance, when the intermediate formal data is XPS format, a tag indicating print settings is written to a predetermined region referred to as a print ticket region. The print settings include, for instance, setting of folding processing, print setting of formation of punch holes, setting of single-sided print or double-sided print, setting of color printing or monochrome printing, and setting of aggregate print.

The print setting specification in the intermediate format data received from the terminal 2 may not be compatible with the printer 4 at a print output destination. After a print execution operation of the printer 4 at a print output destination is performed by a user, when the server 3 converts print instruction data into a format adapted to the printer at an output destination, print output is delayed due to a time taken for the conversion. For this reason, the server generation unit 24 generates intermediate format data which has a format adapted to the first printer and has a high probability of being used, and stores the intermediate format data in the server storage unit 28.

When receiving an output instruction from the first printer identified by the identification unit 22, the server communication unit 21 transmits the intermediate format data stored in a predetermined region of the server storage unit 28 to the first printer. The intermediate format data transmitted to the first printer is an example of print output data.

When an output instruction is received from a printer 4 (second printer) different from the first printer identified by the identification unit 22, the server generation unit 24 converts the intermediate format data received from the terminal 2 to generate second print instruction data adapted to the second printer. Hereinafter the printer 4 different from the first printer identified by the identification unit 22 may be referred to as the second printer. The server communication unit 21 then transmits the generated second print instruction data to the second printer. In this embodiment, the second print instruction data is intermediate format data (second intermediate format data).

The collation unit 25 collates the printer 4 at an output destination with the first printer compatible with the intermediate format data stored in a predetermined region of the server storage unit 28. The determination unit 26 determines a regular printer corresponding to attribute information. The determination unit 26 determines a regular printer in the setting information based on, for instance, the print output log for each attribute information. The determination unit 26 may determine the printer 4 specified by a user as the regular printer. In addition, the determination unit 26 stores information (setting information), which associates the attribute information with the regular printer determined by the determination unit 26, in the server storage unit 28.

The server control unit 27 performs various types of control on the server 3. The server storage unit 28 stores the setting information which indicates a regular printer corresponding to the attribute information. In addition, the server storage unit 28 stores print job data, intermediate format data, management information, a print log, and so on. Each data stored in the server storage unit 28 will be described later in detail.

<Example of Printer>

Figure 4:
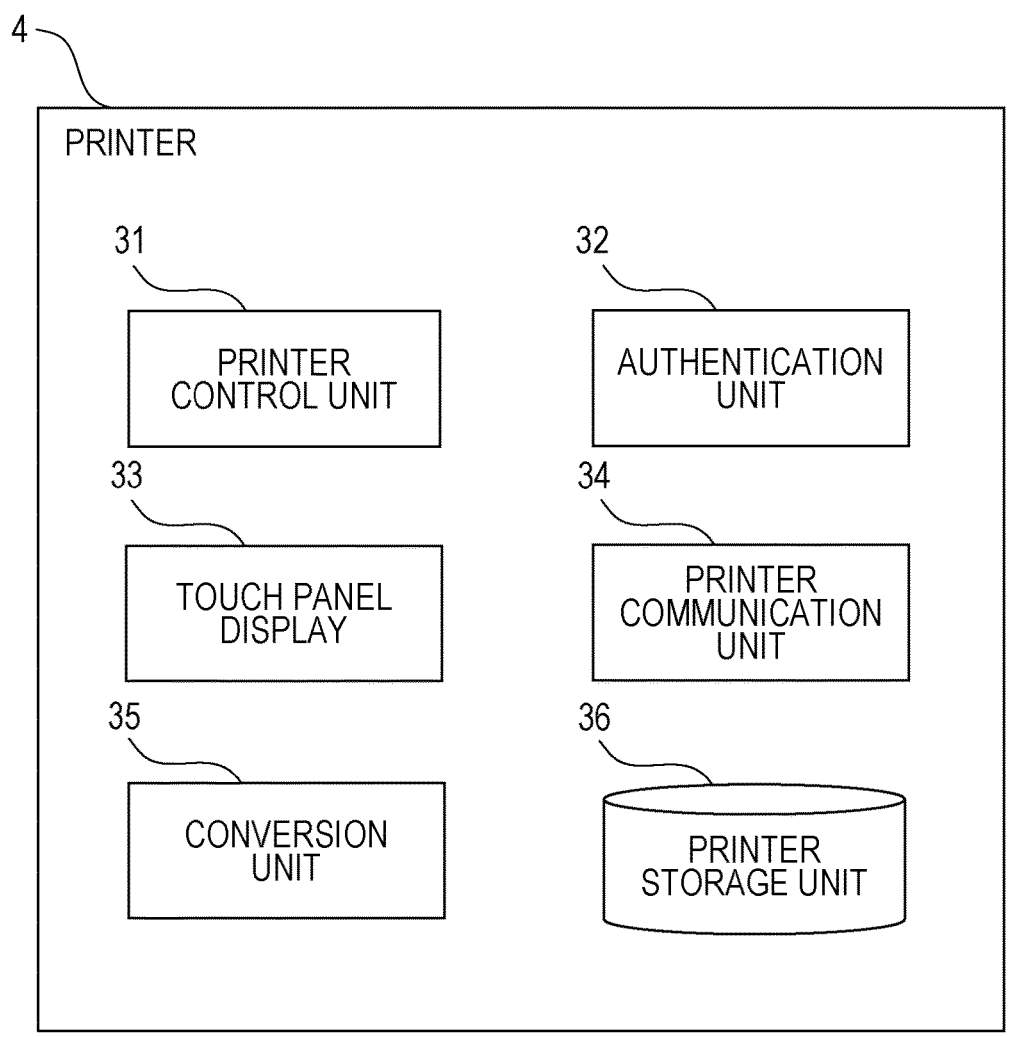
FIG. 4 is a diagram illustrating an example printer.

FIG. 4 indicates an example of a printing machine. The printer 4 includes a printer control unit 31, an authentication unit 32, a touch panel display 33, a printer communication unit 34, a conversion unit 35, and a printer storage unit 36.

The printer control unit 31 performs various types of control on the printer 4. For instance, the printer control unit 31 controls a print mechanism built in the printer 4, and performs printing on a predetermined sheet (such as a sheet for printing). The printer control unit 31 performs printing based on the print format data received from the server 3.

The authentication unit 32 performs authentication as to whether a user who operates the printer 4 is an authorized user. For instance, the authentication unit 32 recognizes user information for identifying a user who operates the printer 4. The user information includes, for instance, a user ID.

For instance, when a card reader is provided in the printer 4, the card reader may perform short-distance wireless communication with a non-contact card of a user, and the authentication unit 32 may recognize the user information. Alternatively, when the touch panel display 33 receives input of user information, the authentication unit 32 may the recognize user information based on the received user information.

The touch panel display 33 includes a display function and an input function. The display function and the input function may be implemented by different devices. For instance, the display function may be implemented by a display and the input function may be implemented by key or the like. The touch panel display 33 displays a job menu screen based on, for instance, print job data transmitted from the server 3.

The printer communication unit 34 communicates with the server 3 via the network 5. The printer communication unit 34 transmits user information (for instance, a user ID) for identifying a user who operates the printer 4, and information (for instance, a printer name) for identifying the printer 4 to the server 3. In addition, the printer communication unit 34 transmits information (for instance, a job ID) for identifying the job selected from the job menu screen to the server 3.

When receiving intermediate format data transmitted from the server 3, the conversion unit 35 converts the intermediate format data into print format data. When receiving print format data from the server 3, the conversion unit 35 does not convert the print format data. The printer storage unit 36 stores the data in predetermined information.

FIG. 5 illustrates an example job menu screen of a printer. The meta information on a print job is transmitted from the server 3, and the touch panel display 33 displays a job menu screen as illustrated in FIG. 5 based on the transmitted meta information on the print job.

The job menu screen illustrated in FIG. 5 includes a user ID, a document name, a date/time (date and time when a print instruction operation was performed), a page (page number), number of copies, and settings (print settings). The information included in a job menu screen is not limited to the information illustrated in FIG. 5.

For instance, a user touches one item on the job menu screen of FIG. 5, and a print job to be executed by a user is selected. Hereinafter an operation of the selection may be referred to as a print execution operation. The printer communication unit 34 transmits the job ID of the selected job to the server 3.

<Example of Information Stored in Server Storage Unit>

Each piece of information stored by the server storage unit 28 will be described. FIG. 6 illustrates a first example of setting information. The setting information illustrated in FIG. 6 includes identification information (user ID) of a user included in the attribute information, and a regular printer name associated with the user ID.

FIG. 7 illustrates a second example of setting information. The setting information illustrated in FIG. 7 includes a user ID and multiple regular printer names associated with the user ID. For instance, when multiple printers 4 daily used by a user are present, multiple regular printer names are associated with the user ID.

FIGS. 8A and 8B illustrate a third example of setting information. FIG. 8A illustrates a table in which a user ID and a group name are associated with each other. FIG. 8B illustrates a table in which a group name and a regular printer name are associated with each other. When the setting information illustrated in FIGS. 8A and 8B is used, the identification unit 22 refers to FIGS. 8A and 8B, and thus the identification unit 22 may identify the regular printer associated with the user ID as the first printer.

The setting information illustrated in FIGS. 8A and 8B is applied, for instance, when a frequently used printer 4 varies from one group to another. When the setting information illustrated in FIGS. 8A and 8B is used, for changing a regular printer, it is sufficient that the setting information in FIG. 8B be changed, and thus an amount of throughput of change may be reduced, as compared with an example in which a regular printer name is associated with each user ID.

Although FIGS. 6 to 8B illustrate examples in which a regular printer is associated with a user ID, a regular printer may be associated with the identification information of each terminal 2 (terminal ID).

The regular printer of the setting information is determined by the determination unit 26 based on a print output log. Alternatively, the regular printer of the setting information may be a printer 4 specified by a user in advance. For instance, when a regular printer has not been specified by a user in advance, the determination unit 26 determines a regular printer based on the print output log.

FIG. 9 illustrates an example print output log. As illustrated in FIG. 9, the print output log includes a print date/time, a user ID, an output destination printer name, a job ID, an IP address, and a terminal ID. The print-output log is used, for instance, for determination of a regular printer by the determination unit 26.

For each user, the determination unit 26 determines a regular printer to be a printer 4 that outputted most frequently within a predetermined period in the past, for instance. This is because it is highly probable that a user uses the printer 4 next that outputted most frequently in the past.

The example illustrated in FIG. 9 indicates a situation in which a user with a user ID of User A utilizes Printer 03 most frequently. Therefore, the determination unit 26 determines the regular printer of User A to be Printer 03, and stores setting information, in which User A of the user ID and Printer 03 of a regular printer name are associated with each other, in the server storage unit 28.

The determination unit 26 predicts a printer 4 to be utilized by a user next using a statistical method or artificial intelligence (AI) based on the print output log within a predetermined period, and may set the printer 4 to the regular printer of the setting information based on a result of the prediction.

The determination unit 26 may analyze a printer 4 which is used most frequently by a user for each day of the week based on the print output log, for instance, and may determine a regular printer for each day of the week and set the regular printer in the setting information. For each user, the determination unit 26 may determine a regular printer to be a printer 4 that outputted a predetermined number of times or more within a predetermined period in the past.

For instance, a case is assumed, in which a user with a user ID of User B goes on a business trip on Wednesday, and the user frequently uses Printer 01 installed at a business trip destination. In this case, the determination unit 26 determines the regular printer of User B on Wednesday to be Printer 01, and sets setting information, in which User B, Printer 01, and Wednesday are associated with each other, in the server storage unit 28.

Since the day of the week is included in setting information, for instance, when a user is scheduled to go on a business trip on a specific day, it is possible to increase the probability that the set regular printer is utilized by the user next time.

The determination unit 26 may adjust a period (predetermined period) in the print output log used for determination of a regular printer, based on the timing of change of assigned-section information of a user. For instance, the determination unit 26 determines whether change in the assigned-section or change in the place of work has occurred based on the assigned-section information (for instance, the group name illustrated in FIG. 8A) of a user.

When change in the assigned-section or change in the place of work has occurred, the determination unit 26 may use the print output log after the occurrence for determination of a regular printer. This is because it is highly probable that a printer 4 with high frequency of use is changed due to the change in the assigned-section or change in the place of work.

FIG. 10 illustrates an example of cache management information. The cache management information illustrated in FIG. 10 is management information on cache data (intermediate format data) stored in a predetermined region of the server storage unit 28. The cache management information includes JobID for identifying print job data, a printer name, a cache deletion deadline, and a cache storage location. The cache management information illustrated in FIG. 10 may include attribute information (either one or both of user ID and terminal ID) corresponding to intermediate format data.

As described above, the intermediate format data stored in a predetermined region is intermediate format data in a format adapted to the first printer. Therefore, the printer name of the cache management information is the regular printer name corresponding to the attribute information of the print job data indicated by JobID.

The cache deletion deadline is set to the intermediate format data, and when printing is executed, even before the cache deletion deadline, the intermediate format data is deleted. However, even when print job data is transmitted from the terminal 2, a print instruction may not be transmitted from the printer 4 and printing may not be executed. When the data volume in a predetermined region is increased, the capacity of the server storage unit 28 is severely affected.

Therefore, in this embodiment, as illustrated in FIG. 10, a deletion deadline is set to each data. Since the cache data with the deletion deadline reached are deleted, it is possible to efficiently utilize the resources of the system of the server 3.

Even when the data in a predetermined region is deleted, the server 3 is able to give a print instruction to the printer 4 using the print job data stored at the time of reception from the terminal 2. For instance, when the intermediate format data of the print job data is not adapted to the output printer, the server generation unit 24 may convert the intermediate format data in the print job data stored at the time of reception from the terminal 2 into a format adapted to the output printer.

In the example illustrated in FIG. 10, the deadline is set for each intermediate format data. However, setting may be made such that all intermediate format data is collectively deleted at a predetermined timing. For instance, setting may be made such that all the cache data is deleted at 0:00 on a predetermined day of the week.

Also, in the example illustrated in FIG. 10, "NULL" is set to the printer name, the cache deletion deadline, and the cache storage location of data with a JobID of Job00002, thus the example indicates that the intermediate format data is not present (deleted). When the cache data is not present, the row itself may be deleted.

The example illustrated in FIG. 10, includes multiple rows having a Job ID of Job00003, indicates that intermediate format data having a Job ID of Job00003 is held in the format adapted to multiple printers 4.

Each information (for instance, information illustrated in FIGS. 6 to 10) stored in the server storage unit 28 may be allowed to be displayed on a display device connected to the server 3. Also, attribute information may be included in the cache management information as described above. For instance, even when a regular printer associated with a user is updated, it is possible to check to see whether the already generated intermediate format data is adapted to the regular printer by displaying the setting information illustrated in FIGS. 6 to 8B, and the cache management information illustrated in FIG. 10.

<Example of Determination Processing of Regular Printer>

Figure 11:
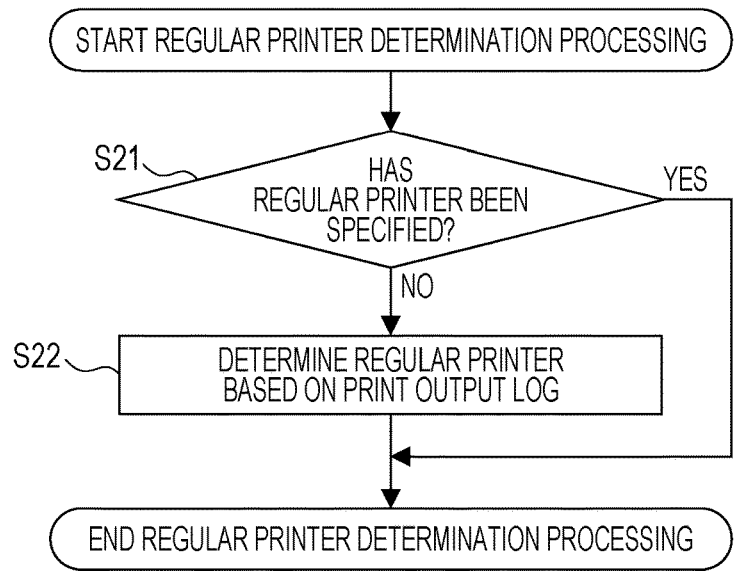
FIG. 11 is a flowchart illustrating an example of determination processing of a regular printer.

FIG. 11 is a flowchart illustrating an example of determination processing of a regular printer. The determination unit 26 determines whether a regular printer is specified by a user in advance (step S21). For instance, the determination unit 26 refers to the setting information of the server storage unit 28, and determines whether a regular printer has been set.

When a regular printer is not specified by a user (NO in step S21), the determination unit 26 determines a regular printer based on the print output log for each attribute information (step S22). The determination unit 26 sets the determined regular printer to the setting information of the server storage unit 28.

The determination unit 26 performs the processing in steps S21 and S22, for instance, at a predetermined timing before receiving a print instruction, and determines a regular printer. Alternatively, the determination unit 26 may perform the processing in steps S21 and S22 when receiving print job data from the terminal 2.

Alternatively, the determination unit 26 may perform the processing in step S22 and update the regular printer when printing is executed and a print log is added. This is because when a print log is added, the regular printer determined in the processing in step S22 may be changed.

<Example of Processing of Terminal>

Figure 12:
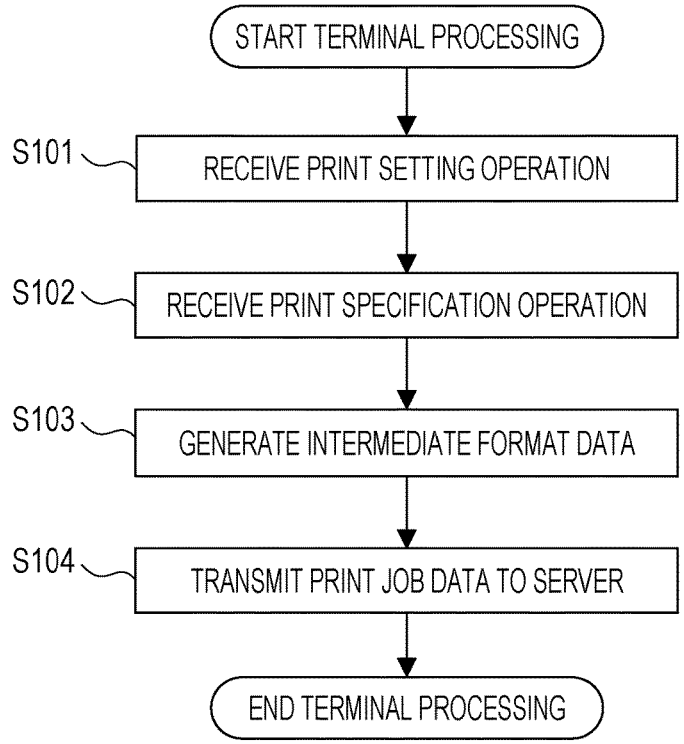
FIG. 12 is a flowchart illustrating an example flow of processing of a terminal.

FIG. 12 is a flowchart illustrating an example flow of processing of a terminal. For instance, a predetermined software (for instance, a document generation software) is started up by a user who operates the terminal 2, and an operation of opening a relevant file is performed via the terminal input unit 15.

The terminal 2 receives the operation, starts up the specified software, and opens a relevant file. It is assumed that a print setting operation of the running software is performed on the terminal 2. The terminal 2 receives the print setting operation (step S101). The print settings include, for instance, setting of single-sided print or double-sided print, setting of color printing or monochrome printing, and setting of aggregate print.

When a print instruction operation is performed on the terminal 2, the terminal 2 receives the print instruction operation (step S102). The terminal generation unit 12 then generates print data. The print data may be one piece of data (for instance, document data), or may include multiple pieces of data (for instance, document data and image data).

An object to be printed may be data stored in the terminal 2, such as a text file, or may be display contents not stored in the terminal 2, such as a display screen of a browser.

The virtual print driver 13 generates intermediate format data based on the print data (step S103). The terminal communication unit 14 of the terminal 2 transmits a print job data including the intermediate format data and attribute information to the server 3 (step S104). The attribute information includes either one or both of the identification information (for instance, the user ID) of a user who has performed the print instruction operation and the identification information of the terminal 2 (for instance, the terminal ID). The intermediate format data includes the print settings received in step S101.

<Example of Processing of Server of First Embodiment>

Figure 13:
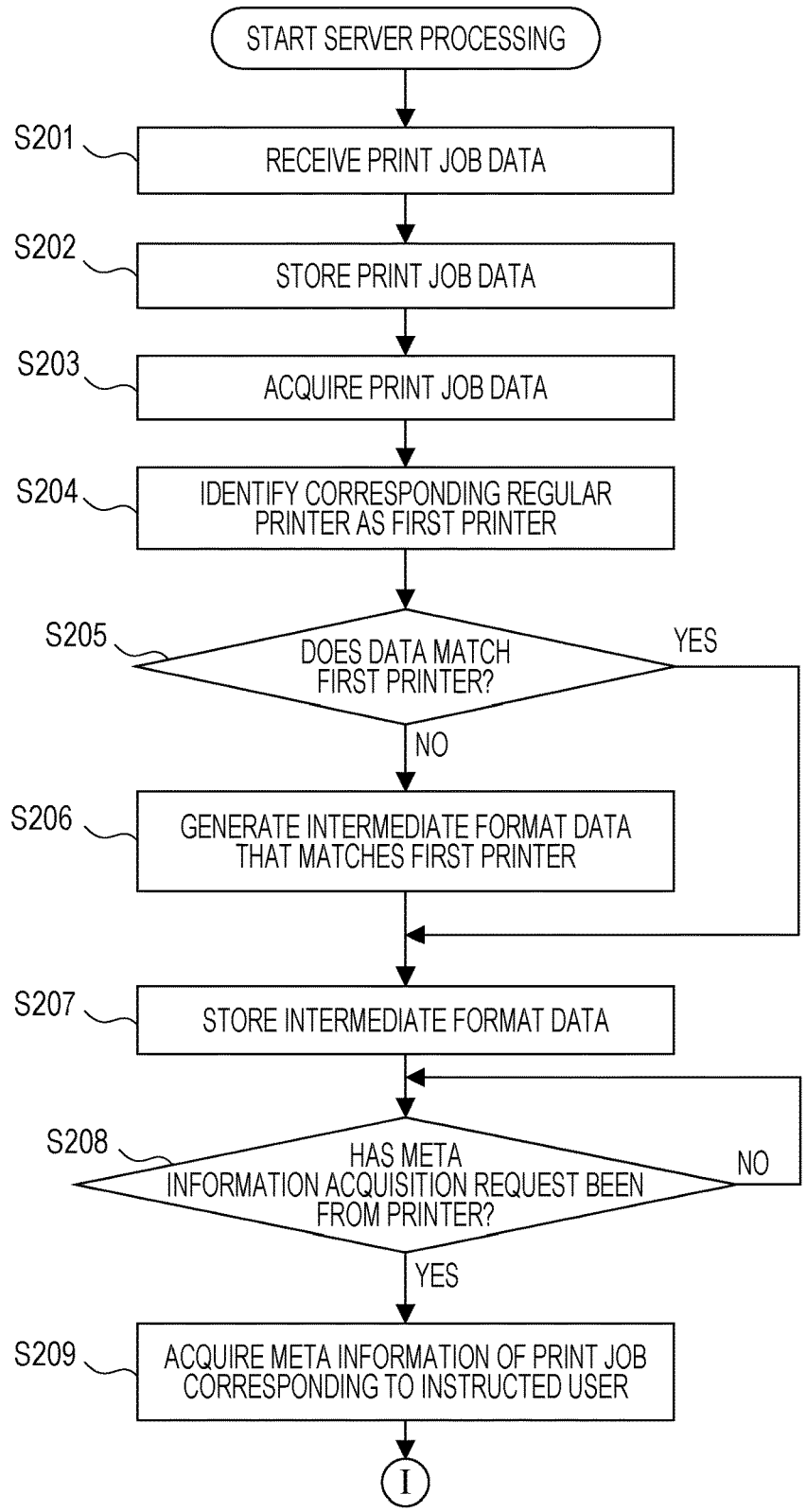
FIG. 13 is a flowchart (part 1) illustrating an example flow of processing of a server of the first embodiment.
Figure 14:
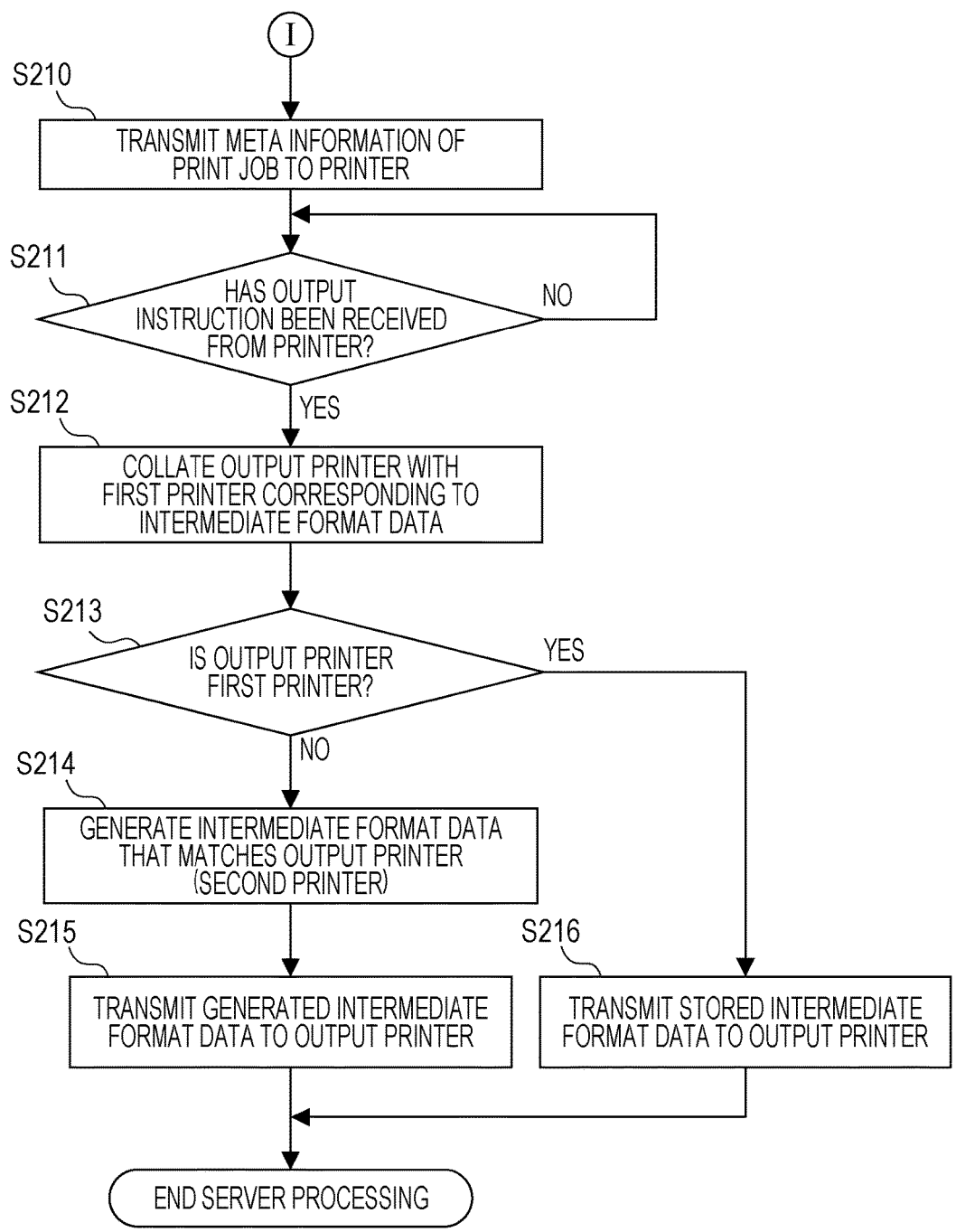
FIG. 14 is a flowchart (part 2) illustrating an example flow of processing of a server of the first embodiment.

FIGS. 13 and 14 are each a flowchart illustrating an example flow of the processing of the server of the first embodiment. The server communication unit 21 receives print job data from the terminal 2 (step S201). The server control unit 27 causes the server storage unit 28 to store the received print job data (step S202).

The server control unit 27 then acquires the print job data stored in the server storage unit 28 (step S203). The server control unit 27 stores the print job data in the server storage unit 28, thus for instance, even when transmission of the intermediate format data from the server 3 to the printer 4 is failed, re-transmission of the intermediate format data is possible.

In step S202, the server control unit 27 may store the received print job data in the cache memory in the server storage unit 28 as well as a cache memory (not illustrated) included in the server control unit 27. When the print job data is stored in the cache memory, the server control unit 27 may omit the processing in step S203. For instance, when the cache memory included in the server control unit 27 is a semiconductor memory and the server storage unit 28 is a hard disk drive, the processing speed of the server 3 may be increased by using the data in the cache memory.

The identification unit 22 identifies the regular printer as the first printer based on the attribute information corresponding to the intermediate format data received from the terminal 2, and setting information which is stored in the server storage unit 28 and indicates the regular printer corresponding to the attribute information (step S204). The setting information is, for instance, the information illustrated in FIGS. 6 to 8B.

The determination unit 23 determines whether the intermediate format data included in the print job data received from the terminal 2 is adapted to the first printer identified by the identification unit 22 (step S205). For instance, when a correspondence relationship between a print setting specification of the printer 4 (for instance, a print setting specification of a vendor) and the intermediate format data is stored in the server storage unit 28, the determination unit 23 may make the determination in step S205 based on the correspondence relationship.

In the case of NO in step S205, the intermediate format data received from the terminal 2 is not adapted to the print setting specification of the first printer. Thus, the server generation unit 24 converts the intermediate format data received from the terminal 2 to generate intermediate format data adapted to the first printer identified by the identification unit 22 (step S206).

The print format of the intermediate format data adapted to the printer 4 may vary from one vendor to another, or may vary from one model to another, for instance. For instance, when the print format varies from one vendor to another, the server generation unit 24 converts the intermediate format data into a print format which is adapted to the vendor of the first printer. Also, for instance, when the print format varies from one model to another, the server generation unit 24 converts the intermediate format data into a print format which is adapted to the model of the first printer.

The server control unit 27 stores the generated intermediate format data in a predetermined region of the server storage unit 28 (step S207). In the case of YES in step S205, the server control unit 27 stores the intermediate format data received from the terminal 2 in a predetermined region of the server storage unit 28. In the case of NO in step S205, the server control unit 27 stores the intermediate format data generated in step S206 by the server generation unit 24 in a predetermined region of the server storage unit 28.

In other words, in the processing of step S207, the intermediate format data in a format adapted to the first printer is stored in a predetermined region of the server storage unit 28 regardless of the result in step S205.

The server control unit 27 stays on stand-by until a meta information acquisition request is received from the printer 4, and when a meta information acquisition request is not received, the flow does not proceed to the subsequent processing related to the flow (NO in step S208). When a meta information acquisition request is received from the printer 4 (YES in step S208), the server control unit 27 acquires meta information on the print job corresponding to the instructed user from the server storage unit 28 (step S209). The meta information on the print job is, for instance, the information indicated in the job menu screen illustrated in FIG. 5.

The meta information acquisition request transmitted from the printer 4 includes, for instance, user information (for instance, a user ID) identified by the authentication unit 32 and information (for instance, a printer name) for identifying the printer 4. In step S209, the server control unit 27 acquires the meta information on the print job corresponding to the received user ID, from the server storage unit 28, for instance.

The server communication unit 21 transmits the meta information on the print job acquired by the server control unit 27 to the printer 4 (printer 4 which has transmitted the meta information acquisition request) at an output destination (step S210). A job menu screen (see, for instance, FIG. 5) based on the transmitted meta information is displayed on the touch panel display 33 of the printer 4. When a job on the job menu screen is selected by a user, information (for instance, a job ID) for identifying the selected job is transmitted to the server 3.

The server control unit 27 stays on stand-by until an output instruction including information for identifying the selected job is received from the printer 4 at the output destination, and when an output instruction is not received, the flow does not proceed to the subsequent processing (NO in step S211).

When the server communication unit 21 receives an output instruction from the printer 4 at the output destination (YES in step S211), the collation unit 25 collates the printer 4 at the output destination with a first printer corresponding to the intermediate format data in a predetermined region of the server storage unit 28 (step S212). For instance, the collation unit 25 determines whether the job ID and the printer name received from the printer 4 at the output destination match the job ID and the printer name corresponding to the job ID in the cache management information (see, for instance, FIG. 10) in the server storage unit 28.

When the printer 4 at the output destination does not match the first printer (NO in step S213), the server generation unit 24 converts the intermediate format data received from the terminal 2 to generate intermediate format data adapted to the printer 4 (the second printer) at the output destination (step S214). The server communication unit 21 then transmits the generated intermediate format data to the printer 4 at the output destination (step S215).

It is to be noted that when the intermediate format data included in the print job data in the server storage unit 28 has a format adapted to the printer 4 at the output destination in step S214, the server generation unit 24 does not have to generate intermediate format data.

When the printer 4 at the output destination matches the first printer (YES in step S213), the server communication unit 21 transmits the intermediate format data stored in a predetermined region of the server storage unit 28 to the printer 4 at the output destination (step S216).

In step S216, when the intermediate format data of the predetermined region is deleted, the server generation unit 24 may convert the intermediate format data of the print job data stored in step S202 to generate intermediate format data adapted to the first printer again. The server communication unit 21 may transmit the generated intermediate format data adapted to the first printer to the printer 4.

After the processing in step S216, the server control unit 27 may delete the transmitted intermediate format data from a predetermined region of the server storage unit 28.

As described above, the server 3 of this embodiment generates intermediate format data which is adapted to the regular printer (the first printer) and has a high probability of being used. When the output printer matches the first printer, the intermediate format data stored in the server storage unit 28 is transmitted to the printer 4 without performing conversion processing, thus the print output speed may be increased.

The server 3 generates intermediate format data adapted to the first printer in advance in the period after the intermediate format data is received from the terminal 2 until an output instruction is received from the printer 4. Therefore, when a print execution operation is performed from the first printer, the processing time may be reduced by the time after the print execution operation is performed until print output is started.

It is to be noted that for a large data volume of intermediate format, a high load is applied to conversion of the intermediate format data. Therefore, only when the data volume (for instance, the number of pages or data volume) of intermediate format data is greater than or equal to a predetermined volume, the generation processing (step S206) of the intermediate format data may be performed.

<Example of Processing of Printer of First Embodiment>

Figure 15:
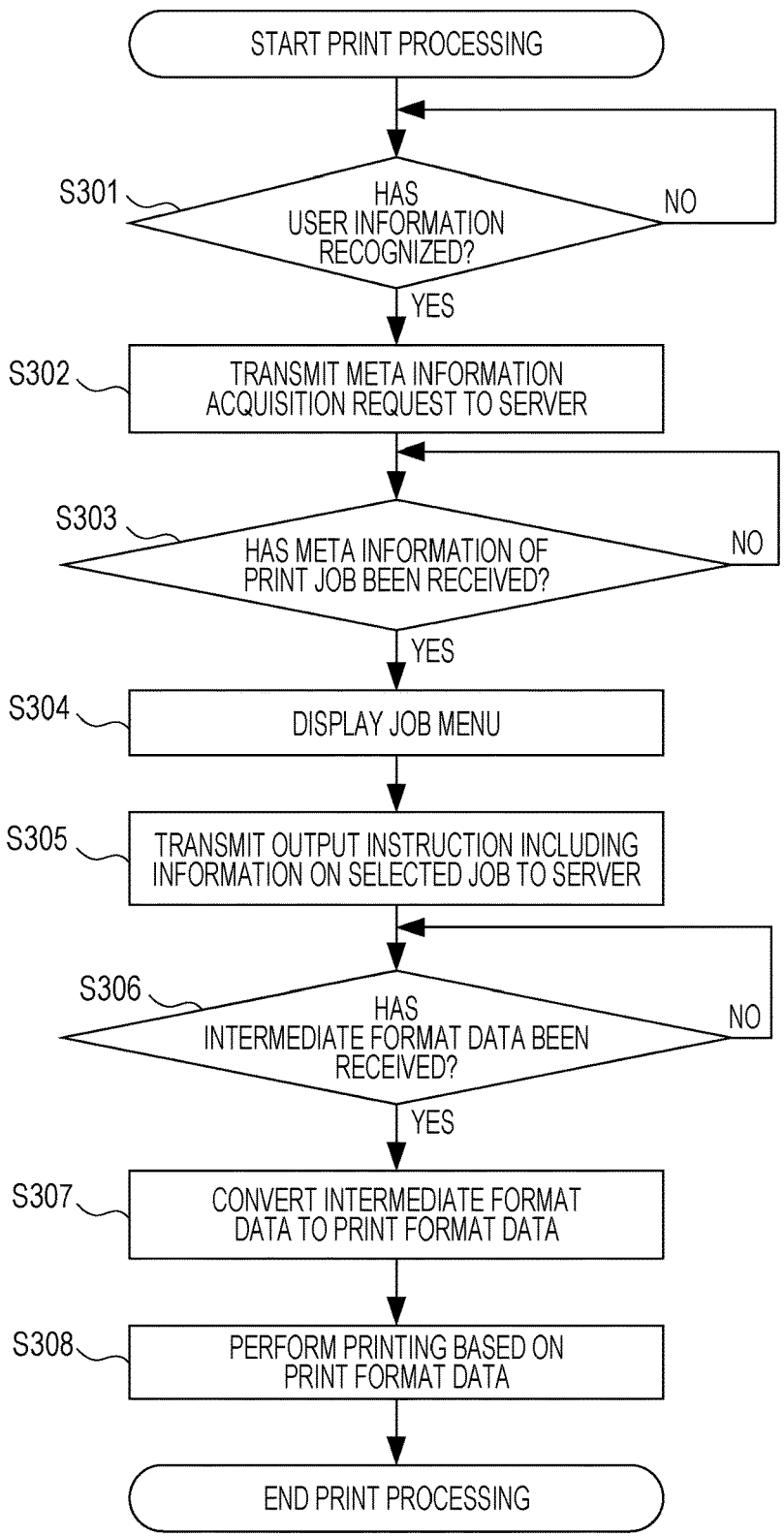
FIG. 15 is a flowchart illustrating an example flow of processing of a printer of the first embodiment.

FIG. 15 is a flowchart illustrating an example flow of processing of the printer of the first embodiment. The printer control unit 31 determines whether user information has been recognized (step S301). For instance, when the touch panel display 33 receives input of user information, or when authentication (user authentication) is performed by the authentication unit 32, the printer control unit 31 determines that the user information has been recognized.

In the case of YES in step S301, the printer communication unit 34 transmits meta information acquisition request including the recognized user information (for instance, the user ID) and information for identifying the printer 4 (for instance, a printer name) to the server 3 (step S302).

The printer control unit 31 determines whether meta information on the print job has been received from the server 3 (step S303). When the meta information on the print job is not received, the printer control unit 31 does not perform the subsequent processing (NO in step S303).

When the meta information on the print job is received (YES in step S303), the touch panel display 33 displays a job menu screen (see, for instance, FIG. 5) based on the meta information on the print job transmitted from the server 3 (step S304). One item of the job menu screen is touched by a user, and a job desired to be printed by the user is selected.

The printer communication unit 34 transmits an output instruction including information (for instance, a job ID) for identifying the selected job in the job menu screen illustrated in FIG. 5 to the server 3 (step S305).

The printer control unit 31 determines whether intermediate format data has been received from the server 3 (step S306). The printer control unit 31 does not start the subsequent processing until intermediate format data is received, and stays on stand-by (NO in step S306). In the case of YES in step S306, the conversion unit 35 converts the intermediate format data into print format data (step S307). The printer control unit 31 then performs print processing based on the print format data (step S308).

<Example of Server in Second Embodiment>

Figure 16:
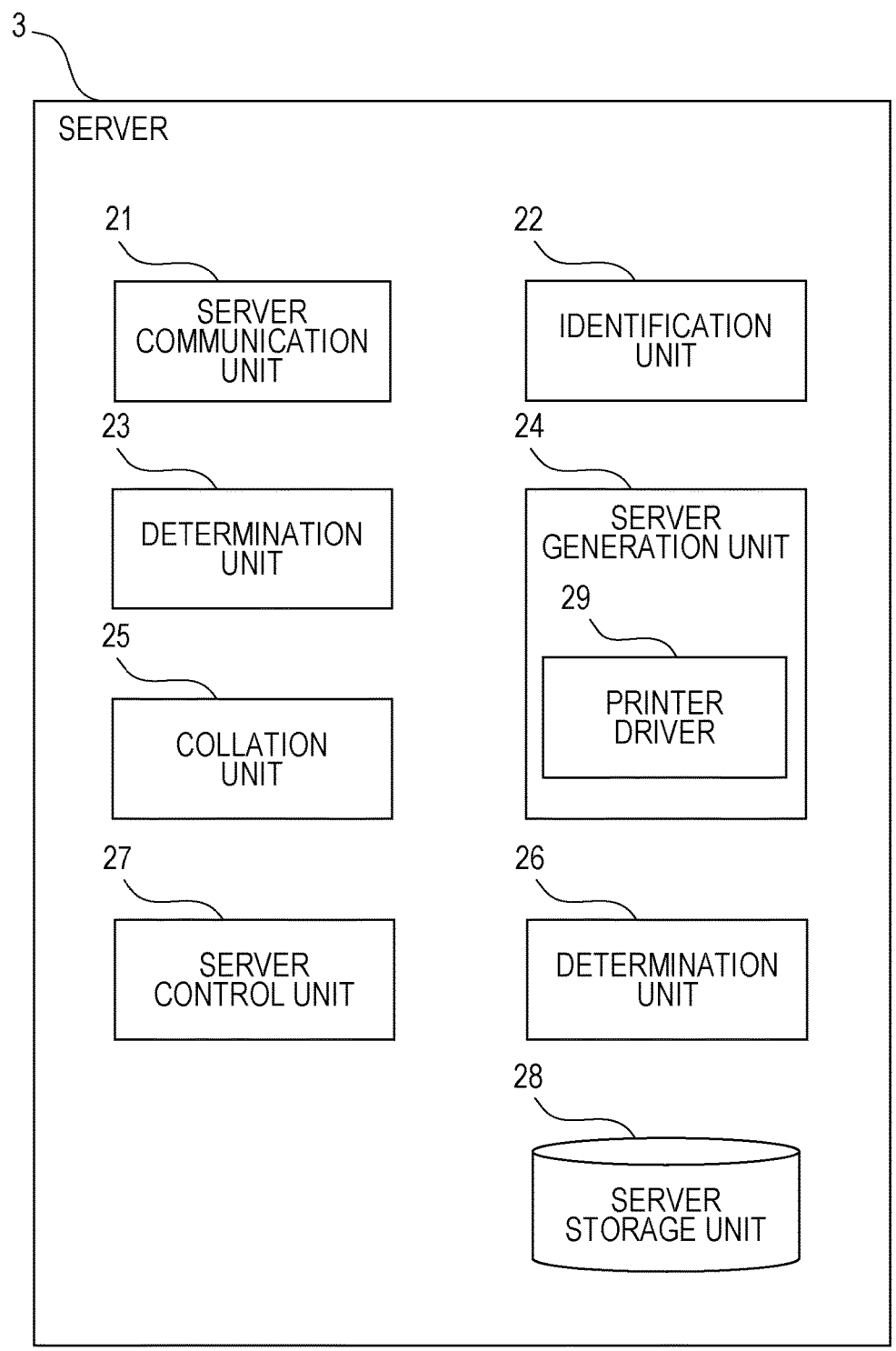
FIG. 16 is a diagram illustrating an example server in a second embodiment and a third embodiment.

FIG. 16 is a diagram illustrating an example server in a second embodiment and a third embodiment. A server 3 includes a server communication unit 21, an identification unit 22, a determination unit 23, a server generation unit 24, a collation unit 25, a determination unit 26, a server control unit 27, and a server storage unit 28.

The server generation unit 24 includes a printer driver 29. Although the components other than the printer driver 29 are the same as the components of the server 3 in the first embodiment illustrated in FIG. 3, the processing of the server 3 in the second and third embodiments is different from the processing of the server 3 in the first embodiment in part, thus the different part will be described.

When an output instruction is received from the first printer identified by the identification unit 22, the printer driver 29 converts the first print instruction data (the first intermediate format data) stored in a predetermined region of the server storage unit 28 to generate print format data adapted to the first printer. The generated print format data is an example of the first print format data. The server communication unit 21 transmits the generated print format data to the first printer. The transmitted print format data is an example of print output data.

When an output instruction is received from the printer 4 (the second printer) different from the first printer identified by the identification unit 22, the printer driver 29 converts the intermediate format data received from the terminal 2 to generate second print instruction data adapted to the second printer. The generated second print instruction data is print format data (the second print format data). The server communication unit 21 then transmits the generated print format data to the second printer.

The components of the terminal 2 in the second embodiment are the same as the components of the terminal 2 in the first embodiment illustrated in FIG. 2. Also, the components of the printer 4 in the second embodiment are the same as the components of the printer 4 in the first embodiment illustrated in FIG. 4. However, since conversion from the intermediate format data into the print format data has been made by the printer driver 29 of the server 3, the printer 4 does not have to include the conversion unit 35.

<Example of Processing of Server in Second Embodiment>

Figure 17:
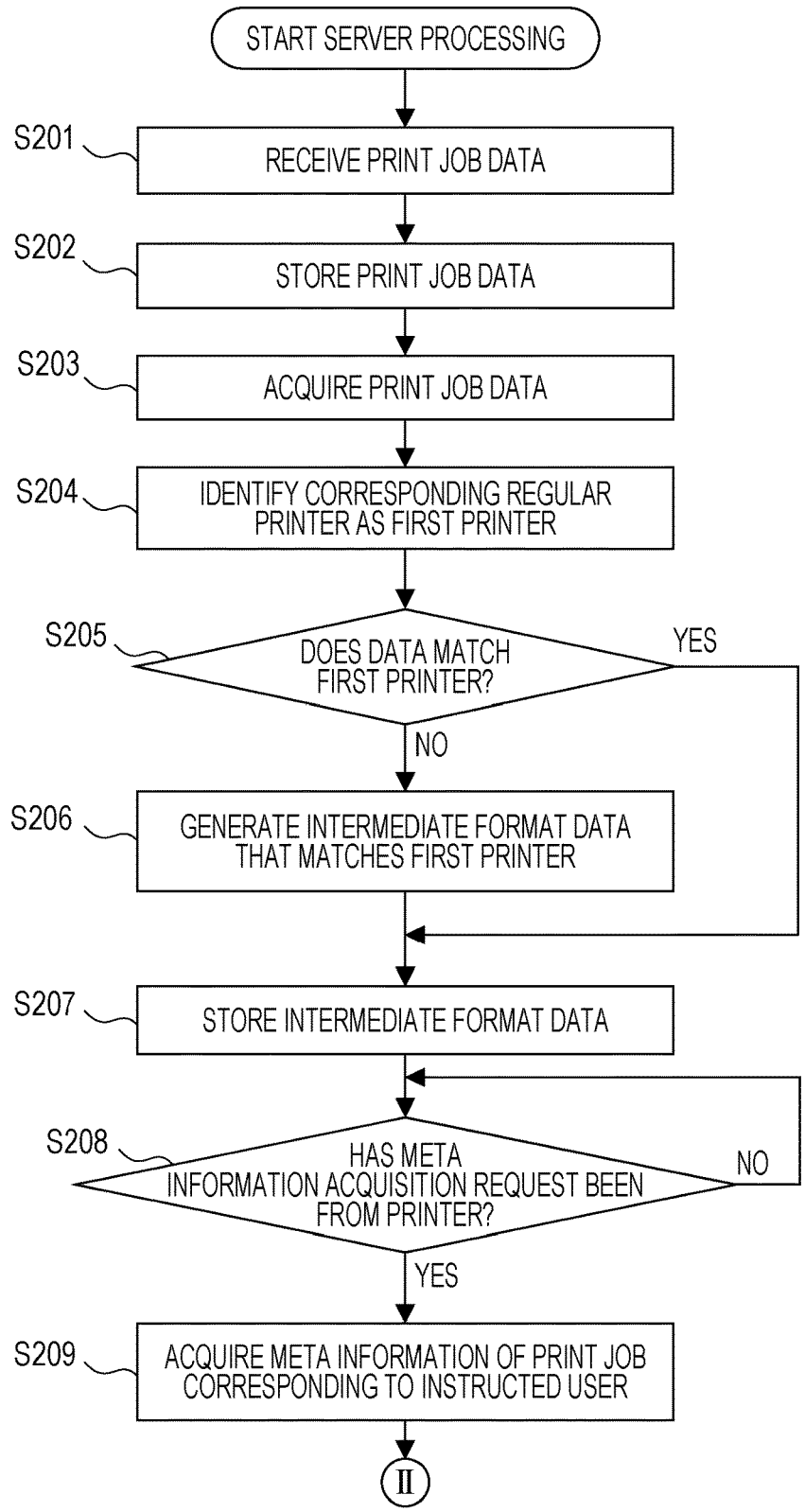
FIG. 17 is a flowchart (part 1) illustrating an example flow of processing of a server of the second embodiment.
Figure 18:
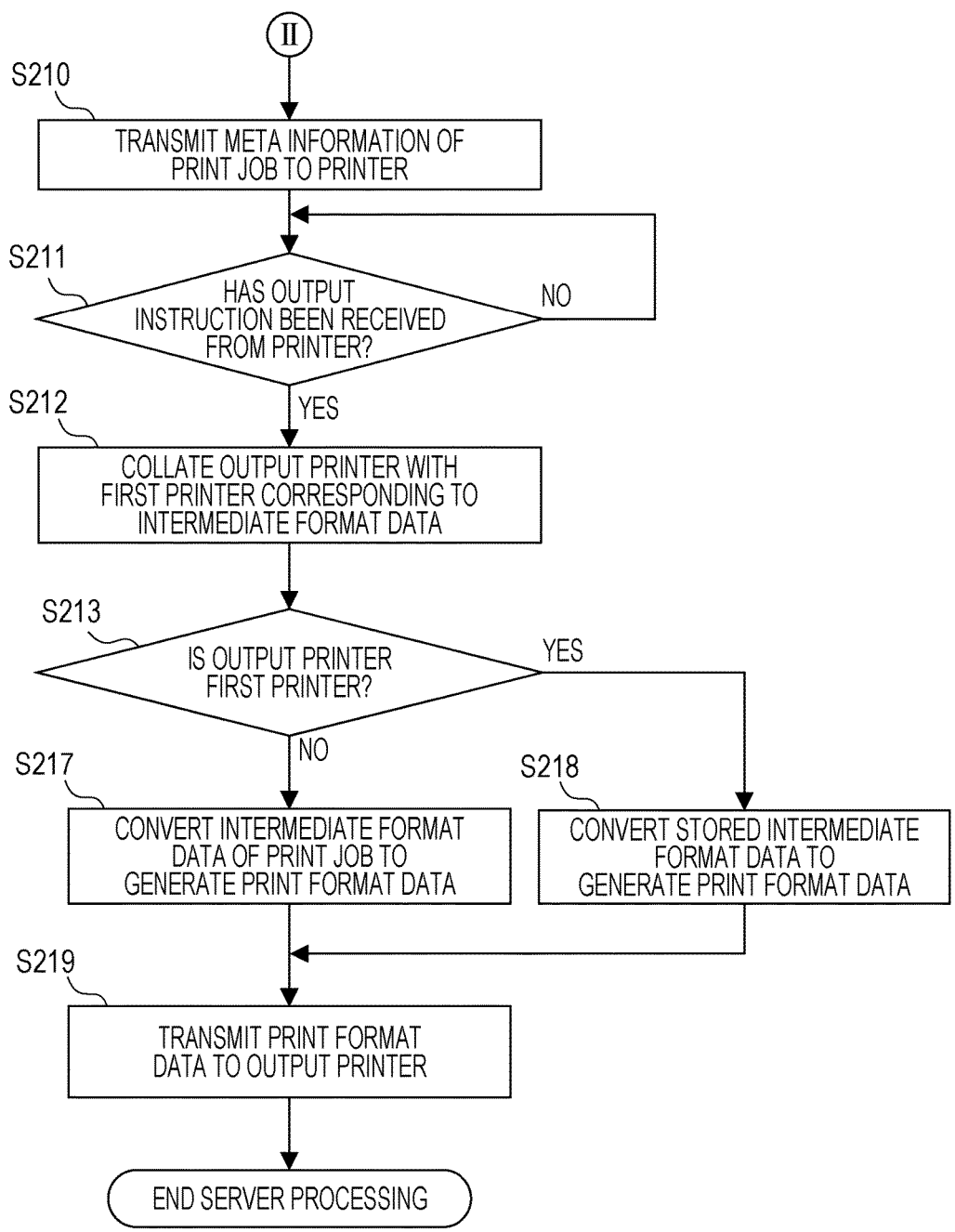
FIG. 18 is a flowchart (part 2) illustrating an example flow of processing of a server of the second embodiment.

FIGS. 17 and 18 are flowcharts illustrating an example flow of processing of the server in the second embodiment. It is to be noted that the regular printer determination processing and the processing of the terminal 2 in the second embodiment are the same as the processing (FIGS. 11 and 12) in the first embodiment, thus a description is omitted.

Also, in FIGS. 17 and 18, the processing other than the processing in steps S217 to S219 is the same as the processing of the server 3 in the first embodiment in FIGS. 13 and 14, thus a description is omitted.

When the printer 4 at an output destination does not match the first printer (NO in step S213), the server generation unit 24 converts the intermediate format data received from the terminal 2 to generate print format data adapted to the printer 4 at the output destination (step S217).

When the printer 4 at the output destination matches the first printer (YES in step S213), the printer driver 29 converts the intermediate format data in a predetermined region to generate print format data adapted to the printer 4 at the output destination (step S218). The print format data adapted to the first printer is an example of the first print instruction data.

The server communication unit 21 transmits the print format data converted in step S217 or S218 to the printer 4 at the output destination (step S219).

In step S218, when the intermediate format data in a predetermined region is deleted, the server generation unit 24 may convert the intermediate format data of the print job data stored in step S202 to generate print format data adapted to the first printer.

When the printer 4 at the output destination does not match the first printer (NO in step S213), before the processing of S217, the server generation unit 24 may convert the intermediate format data received from the terminal 2 to generate intermediate format data in a format adapted to the printer 4 at the output destination.

For instance, due to a reason such as inclusion of a special print format, in some cases, it may be difficult for the printer driver 29 to directly generate print format data adapted to the first printer by converting the intermediate format data not adapted to the first printer. In this case, even when it is difficult for the printer driver 29 to directly generate print format data, it is possible for the server generation unit 24 to generate print format data by once generating intermediate format data in a format adapted to the printer 4 at the output destination.

As described above, in the second embodiment, even when the printer 4 does not have a function of converting intermediate format data into print format data, it is possible to perform printing by converting intermediate format data into print format data by the printer driver 29.

Also, since print format data adapted to the first printer is generated from the intermediate format data adapted to the first printer in the second embodiment, the processing time taken for the generation may be made smaller than the processing time taken for generation of print format data adapted to the first printer from intermediate format data not adapted to the first printer.

<Example of Processing of Printer of Second Embodiment>

Figure 19:
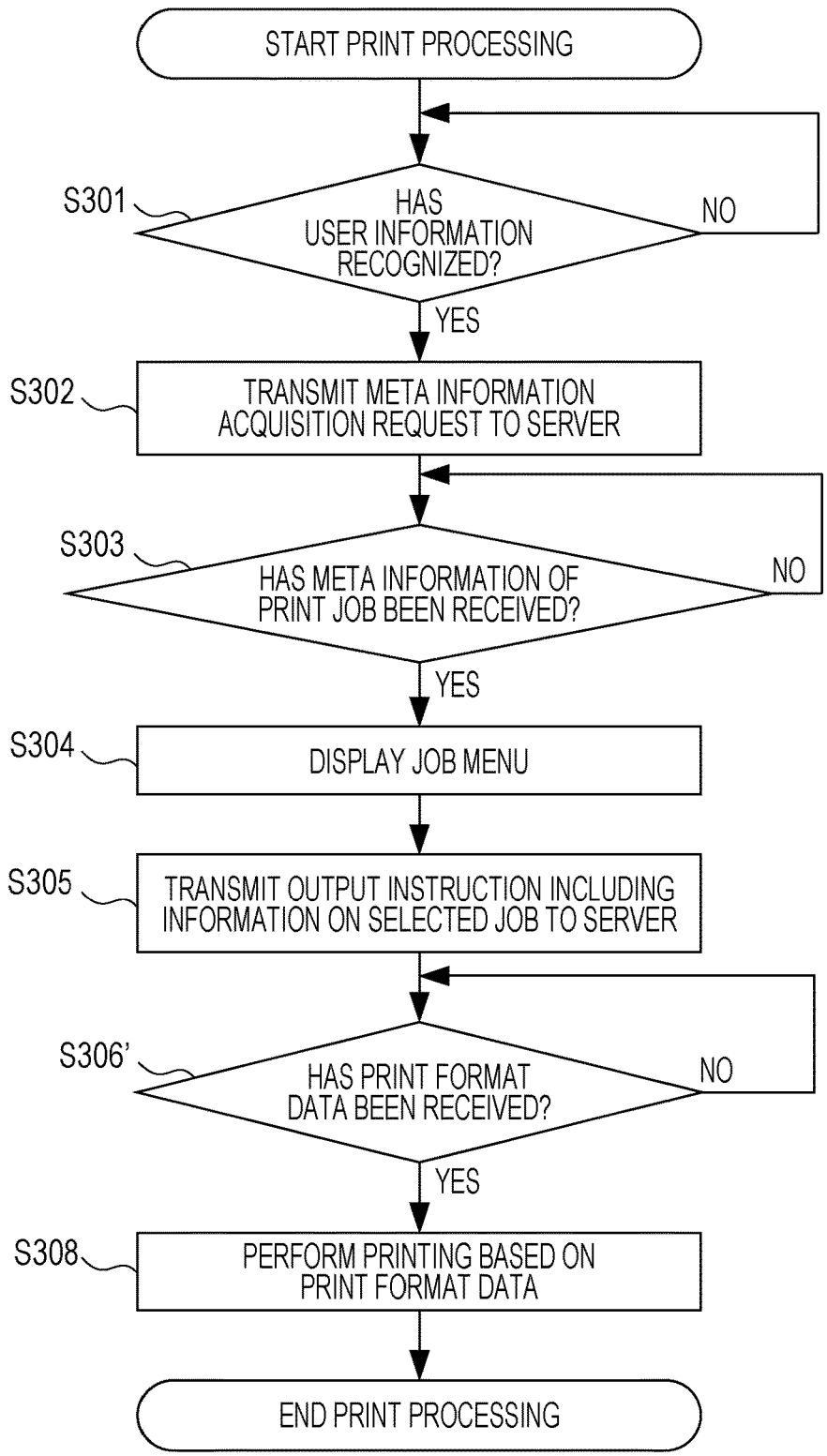
FIG. 19 is a flowchart illustrating an example flow of processing of a printer of the second embodiment.

FIG. 19 is a flowchart illustrating an example flow of processing of the printer of the second embodiment. In FIG. 19, the processing in steps S301 to S305 and S308 is the same as the processing of the printer of the first embodiment illustrated in FIG. 15, thus a description is partially omitted.

The printer control unit 31 determines whether user information has been recognized (step S301). In the case of YES in step S301, the printer communication unit 34 transmits meta information acquisition request including the recognized user information (for instance, the user ID) and information (for instance, a printer name) for identifying the printer 4 to the server 3 (step S302).

The printer control unit 31 determines whether the meta information on the print job has been received from the server 3 (step S303). When the print job data is not received, the printer control unit 31 does not perform the subsequent processing (NO in step S303).

When the print job data is received (YES in step S303), the touch panel display 33 displays a job menu screen (see, for instance, FIG. 5) based on the meta information on the print job transmitted from the server 3 (step S304). The printer communication unit 34 transmits an output instruction including information (for instance, a job ID) for identifying the selected job in the job menu screen illustrated in FIG. 5 to the server 3 (step S305).

The printer control unit 31 determines whether print format data has been received from the server 3 (step S306'). The printer control unit 31 does not start the subsequent processing until print format data is received, and stays on stand-by (NO in step S306'). In the case of YES in step S306', the printer control unit 31 performs print processing based on the print format data (step S308).

In this embodiment, since the server 3 transmits print format data rather than intermediate format data to the printer 4, the printer 4 does not have to convert the intermediate format data into print format data.

<Example of Server in Third Embodiment>

As illustrated in FIG. 16, a server 3 in the third embodiment includes a server communication unit 21, an identification unit 22, a determination unit 23, a server generation unit 24, a collation unit 25, a determination unit 26, a server control unit 27, and a server storage unit 28.

The server generation unit 24 includes a printer driver 29. Although the components other than the printer driver 29 are the same as the components of the server 3 in the first embodiment illustrated in FIG. 3, the processing of the server 3 in the second and third embodiments is different from the processing of the server 3 in the first embodiment in part, thus the different part will be described.

When the print instruction data (intermediate format data) received from the terminal 2 is not adapted to the first printer, the printer driver 29 converts the intermediate format data to generate a first print instruction data adapted to the first printer identified by the identification unit 22, and stores the first print instruction data in a predetermined region of the server storage unit 28. The generated first print instruction data is an example of the print format data (first print format data).

When an output instruction is received from the first printer identified by the identification unit 22, the server communication unit 21 transmits the first print format data stored in a predetermined region of the server storage unit 28 to the first printer. The first print format data transmitted to the first printer is an example of the print output data.

When an output instruction is received from the printer 4 (the second printer) different from the first printer identified by the identification unit 22, the printer driver 29 converts the intermediate format data received from the terminal 2 to generate second print instruction data adapted to the second printer. The generated second print instruction data is print format data (the second print format data). The server communication unit 21 then transmits the generated print format data to the second printer.

The components of the terminal 2 in the third embodiment are the same as the components of the terminal 2 in the first embodiment illustrated in FIG. 2. Also, the components of the printer 4 in the third embodiment are the same as the components of the printer 4 in the first embodiment illustrated in FIG. 4. However, since conversion from the intermediate format data into the print format data has been made by the printer driver 29 of the server 3, the printer 4 does not have to include the conversion unit 35.

<Example of Processing of Server in Third Embodiment>

Figure 20:
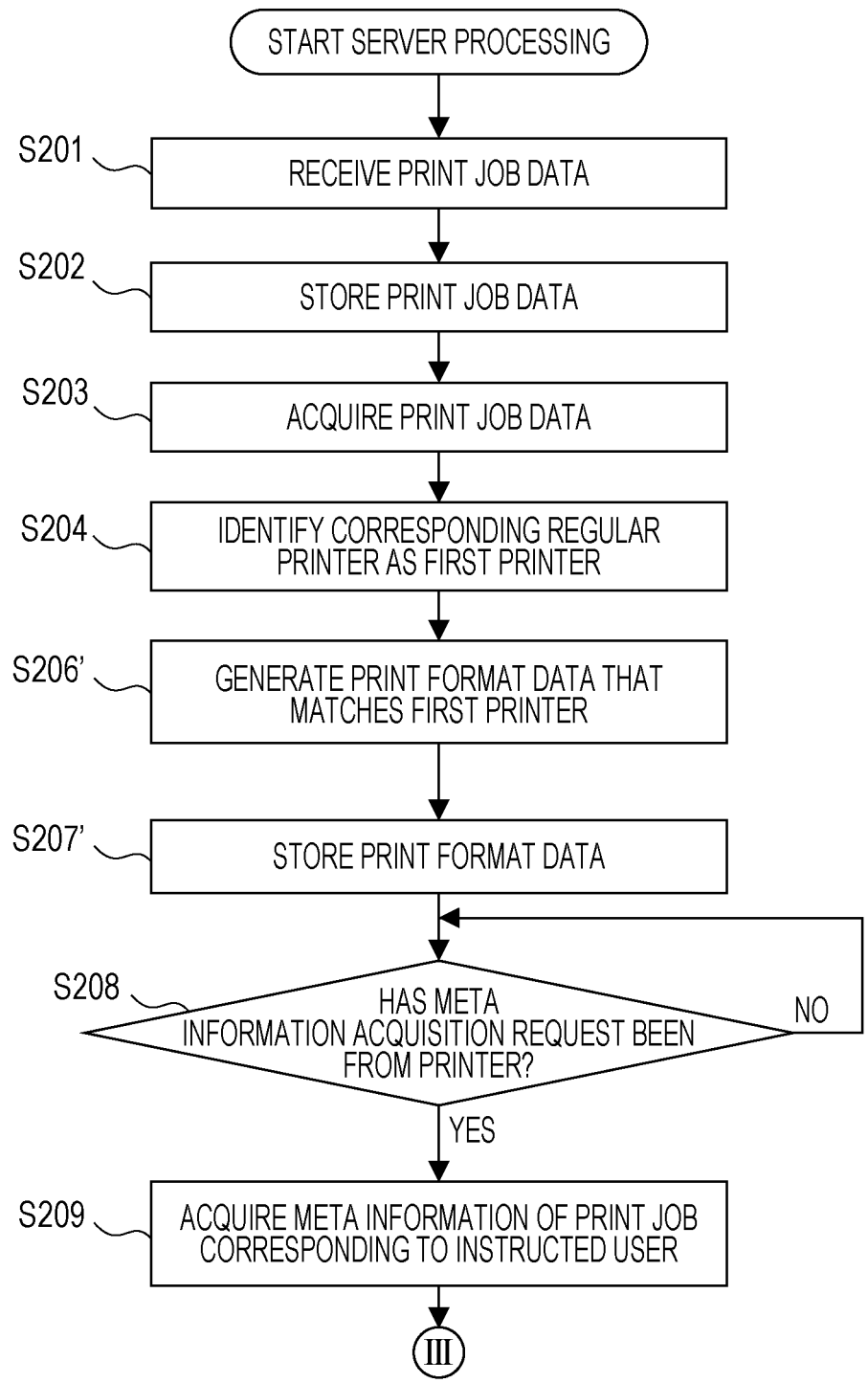
FIG. 20 is a flowchart (part 1) illustrating an example flow of processing of a server of the third embodiment.
Figure 21:
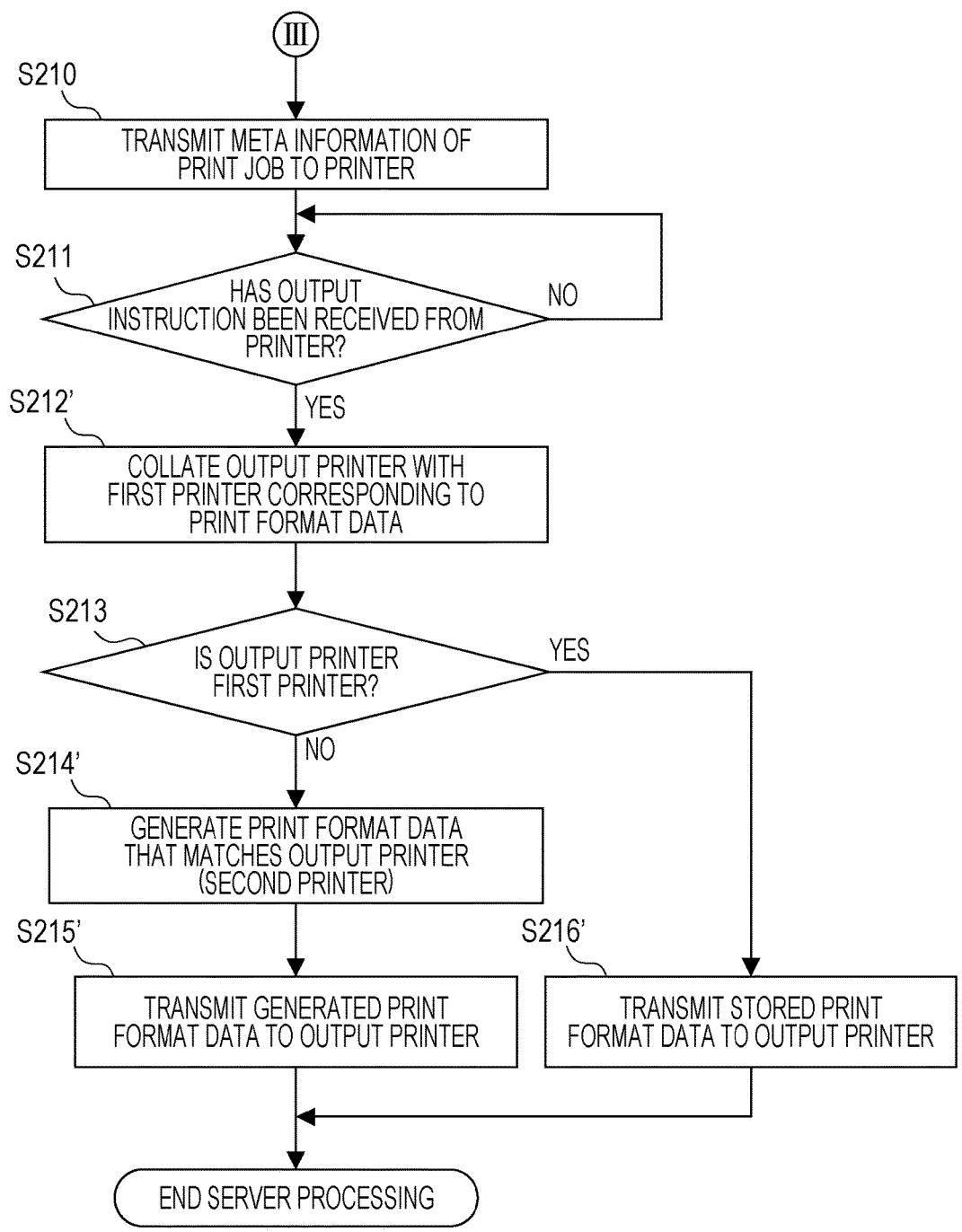
FIG. 21 is a flowchart (part 2) illustrating an example flow of processing of a server of the third embodiment.

FIGS. 20 and 21 are flowcharts illustrating an example flow of processing of the server of the third embodiment. It is to be noted that the regular printer determination processing and the processing of the terminal 2 in the third embodiment are the same as the processing (FIGS. 11 and 12) in the first embodiment, thus a description is omitted. Also, the processing of the printer 4 of the third embodiment is the same as the processing of the printer 4 of the second embodiment illustrated in FIG. 19, thus a description is omitted.

In FIGS. 20 and 21, the processing other than the processing in steps S206', S207', S212', S214', S215' and S216' is the same as the processing of the server 3 of the first embodiment in FIGS. 13 and 14, thus a description is partially omitted.

The server communication unit 21 receives print job data from the terminal 2 (step S201). The server control unit 27 causes the server storage unit 28 to store the received print job data (step S202). The server control unit 27 then acquires the print job data stored in the server storage unit 28 (step S203).

The identification unit 22 identifies the regular printer as the first printer based on the attribute information corresponding to the intermediate format data received from the terminal 2, and setting information which is stored in the server storage unit 28 and indicates the regular printer corresponding to the attribute information (step S204). The setting information is, for instance, the information illustrated in FIGS. 6 to 8B.

The printer driver 29 converts the intermediate format data to generate print format data adapted to the first printer identified by the identification unit 22 (step S206'). The server control unit 27 then stores the print format data in a predetermined region of the server storage unit 28 (step S207').

The server control unit 27 stays on stand-by until a meta information acquisition request is received from the printer 4, and when a meta information acquisition request is not received, the flow does not proceed to the subsequent processing (NO in step S208). When a meta information acquisition request including user information (for instance, a user ID) is received from the printer 4 (YES in step S208), the server control unit 27 acquires meta information on the print job corresponding to the instructed user from the server storage unit 28 (step S209).

The server communication unit 21 transmits the meta information on the print job acquired by the server control unit 27 to the printer 4 (printer 4 which has transmitted the meta information acquisition request) at an output destination (step S210). The server control unit 27 stays on stand-by until information for identifying the selected job is received from the printer 4 at the output destination, and when an output instruction is not received, the flow does not proceed to the subsequent processing (NO in step S211).

When the server communication unit 21 receives information for identifying the selected job (YES in step S211), the collation unit 25 collates the printer 4 at the output destination with a first printer corresponding to the print format data in a predetermined region of the server storage unit 28 (step S212').

In the case of NO in step S213, the server generation unit 24 converts the intermediate format data included in the print job data of the server storage unit 28 to generate print format data adapted to the printer 4 (the second printer) at the output destination (step S214'). It is to be noted that the intermediate format data included in the print job data of the server storage unit 28 is the intermediate format data received from the terminal 2. The server communication unit 21 then transmits the print format data generated in step S214' to the printer 4 at the output destination (step S215').

When the printer 4 at the output destination matches the first printer (YES in step S213), the server communication unit 21 transmits the print format data stored in a predetermined region of the server storage unit 28 to the printer 4 at the output destination (step S216').

When the printer 4 at the output destination does not match the first printer (NO in step S213), before the processing of S214', the server generation unit 24 may convert the intermediate format data included in the print job data into intermediate format data in a format adapted to the printer 4 at the output destination. Even when it is difficult for the printer driver 29 to directly convert intermediate format data into print format data due to a reason such as inclusion of a special print format, it is possible to generate print format data by once converting the intermediate format data into intermediate format data in a format adapted to the printer 4 at the output destination.

As described above, in the third embodiment, even when the printer 4 does not have a function of converting intermediate format data into print format data, it is possible to perform printing by converting intermediate format data into print format data by the printer driver 29. In addition, the print output speed may be further increased by converting intermediate format data into print format data adapted to the regular printer (the first printer) in advance.

<Example of Hardware Configuration of Terminal>

Figure 22:
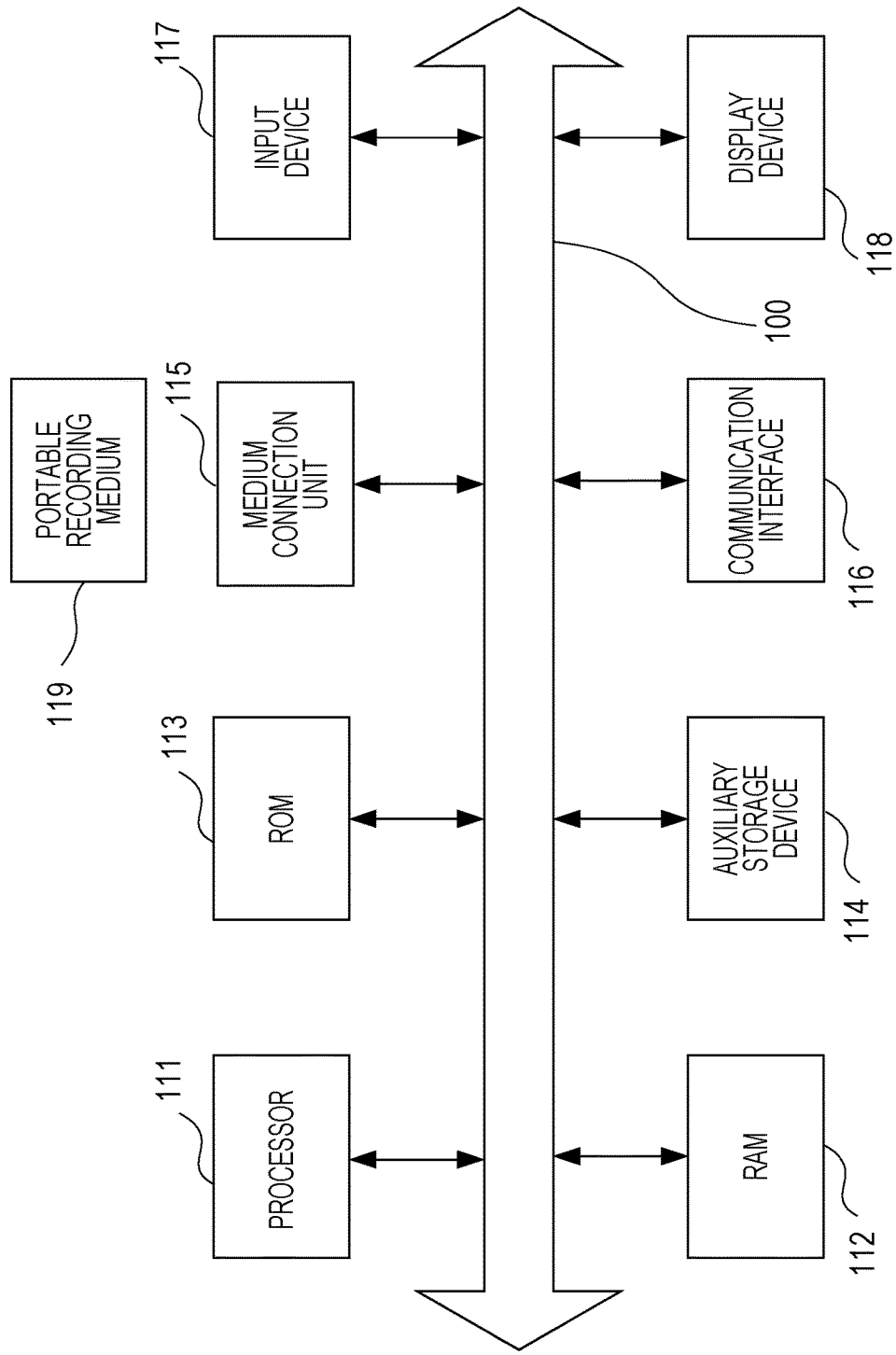
FIG. 22 is a diagram illustrating an example hardware configuration of a terminal.

Next, an example hardware configuration of the terminal 2 will be described with reference to the example of FIG. 22. As illustrated in the example of FIG. 22, a processor 111, a random access memory (RAM) 112, and a read only memory (ROM) 113 are connected to a bus 100.

In addition, an auxiliary storage device 114, a medium connection unit 115, a communication interface 116, an input device 117, and a display device 118 are connected to the bus 100. The processor 111 executes a program loaded in the RAM 112. As the program to be executed, a program that performs the processing in the embodiment may be applied.

The ROM 113 is a non-volatile storage device that stores programs loaded in the RAM 112. The auxiliary storage device 114 is a storage device that stores various types of information, and for instance, a semiconductor memory or the like may be applied to the auxiliary storage device 114.

The medium connection unit 115 is provided so as to connectable to a portable recording medium 119. When the terminal 2 is a thin client terminal, the auxiliary storage device 114 and the medium connection unit 115 do not have to be included in the terminal 2.

As the portable recording medium 119, a portable memory may be applied. The portable recording medium 119 may store a program that performs the processing in the embodiment.

The terminal storage unit 17 may be implemented by the RAM 112 or the auxiliary storage device 114. The terminal communication unit 14 may be implemented by the communication interface 116. The terminal input unit 15 may be implemented by the input device 117. The terminal display unit 16 may be implemented by the display device 118.

The terminal control unit 11, the terminal generation unit 12, and the virtual print driver 13 may be each implemented by executing a given program by the processor 111.

The RAM 112, the ROM 113, the auxiliary storage device 114, and the portable recording medium 119 are each an example of a tangible computer-readable storage medium. Each of these tangible storage media is not a transitory medium like a signal carrier wave.

<Example of Hardware Configuration of Server>

Figure 23:
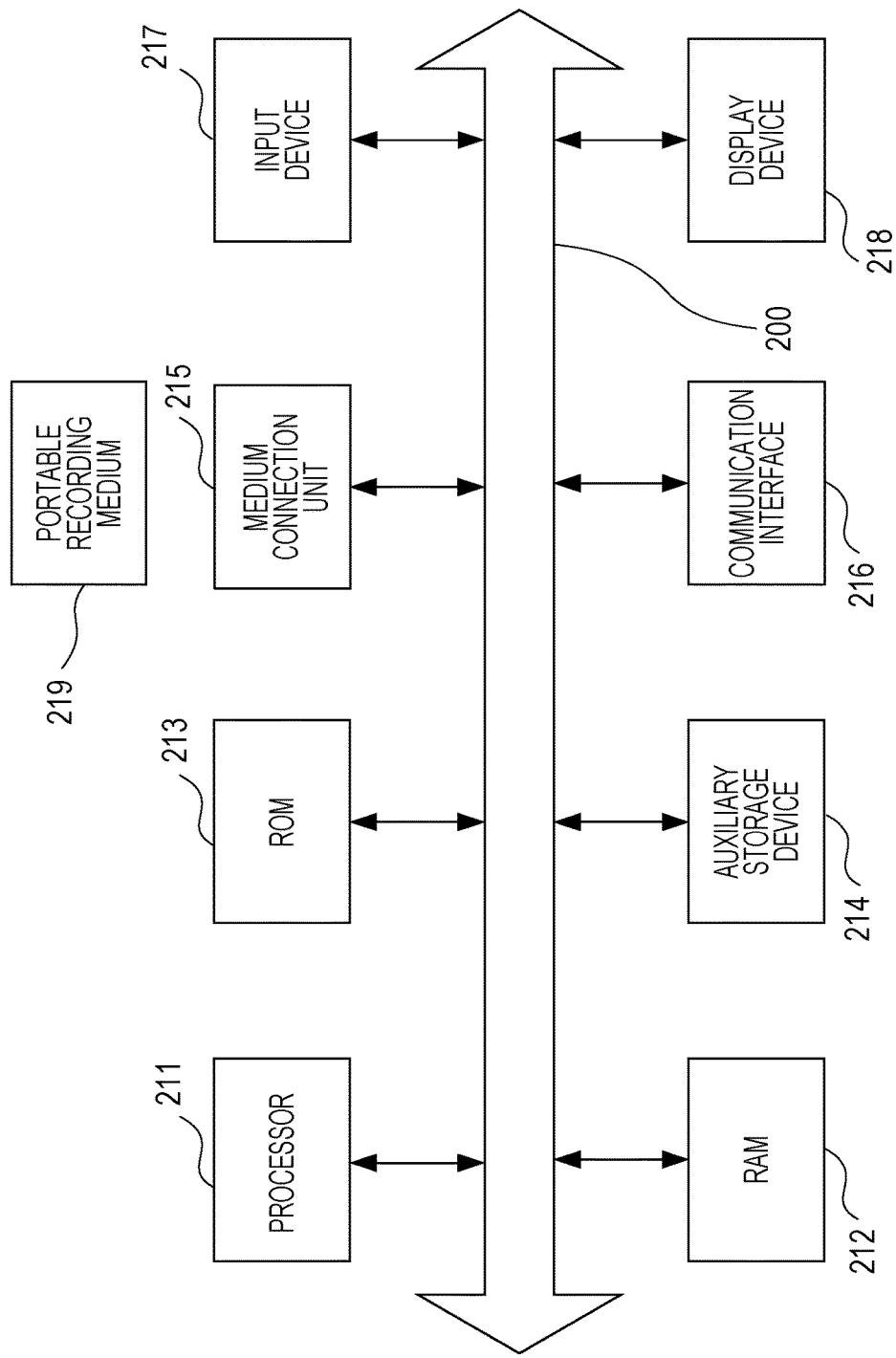
FIG. 23 is a diagram illustrating an example hardware configuration of a server.

Next, an example hardware configuration of the server 3 will be described with reference to the example of FIG. 23. As illustrated in the example of FIG. 23, a processor 211, a RAM 212, and a ROM 213 are connected to a bus 200.

In addition, an auxiliary storage device 214, a medium connection unit 215, a communication interface 216, an input device 217, and a display device 218 are connected to the bus 200. The processor 211 executes a program loaded in the RAM 212. As the program to be executed, a program that performs the processing in the embodiment may be applied.

The ROM 213 is a non-volatile storage device that stores programs loaded in the RAM 212. The auxiliary storage device 214 is a storage device that stores various types of information, and for instance, a hard disk or a semiconductor memory or the like may be applied to the auxiliary storage device 214. The medium connection unit 215 is provided so as to connectable to a portable recording medium 219.

As the portable recording medium 219, a portable memory or an optical disc (for instance, a compact disc (CD) or a digital versatile disc (DVD)) may be applied. The portable recording medium 219 may store a program that performs the processing in the embodiment.

The server storage unit 28 may be implemented by the RAM 212 or the auxiliary storage device 214. The server communication unit 21 may be implemented by the communication interface 216. The identification unit 22, the determination unit 23, the server generation unit 24, the collation unit 25, the determination unit 26, the server control unit 27, and the printer driver 29 may be each implemented by executing a given program by the processor 211.

The RAM 212, the ROM 213, the auxiliary storage device 214, and the portable recording medium 219 are each an example of a tangible computer-readable storage medium. Each of these tangible storage media is not a transitory medium like a signal carrier wave.

<Example of Hardware Configuration of Printer>

Figure 24:
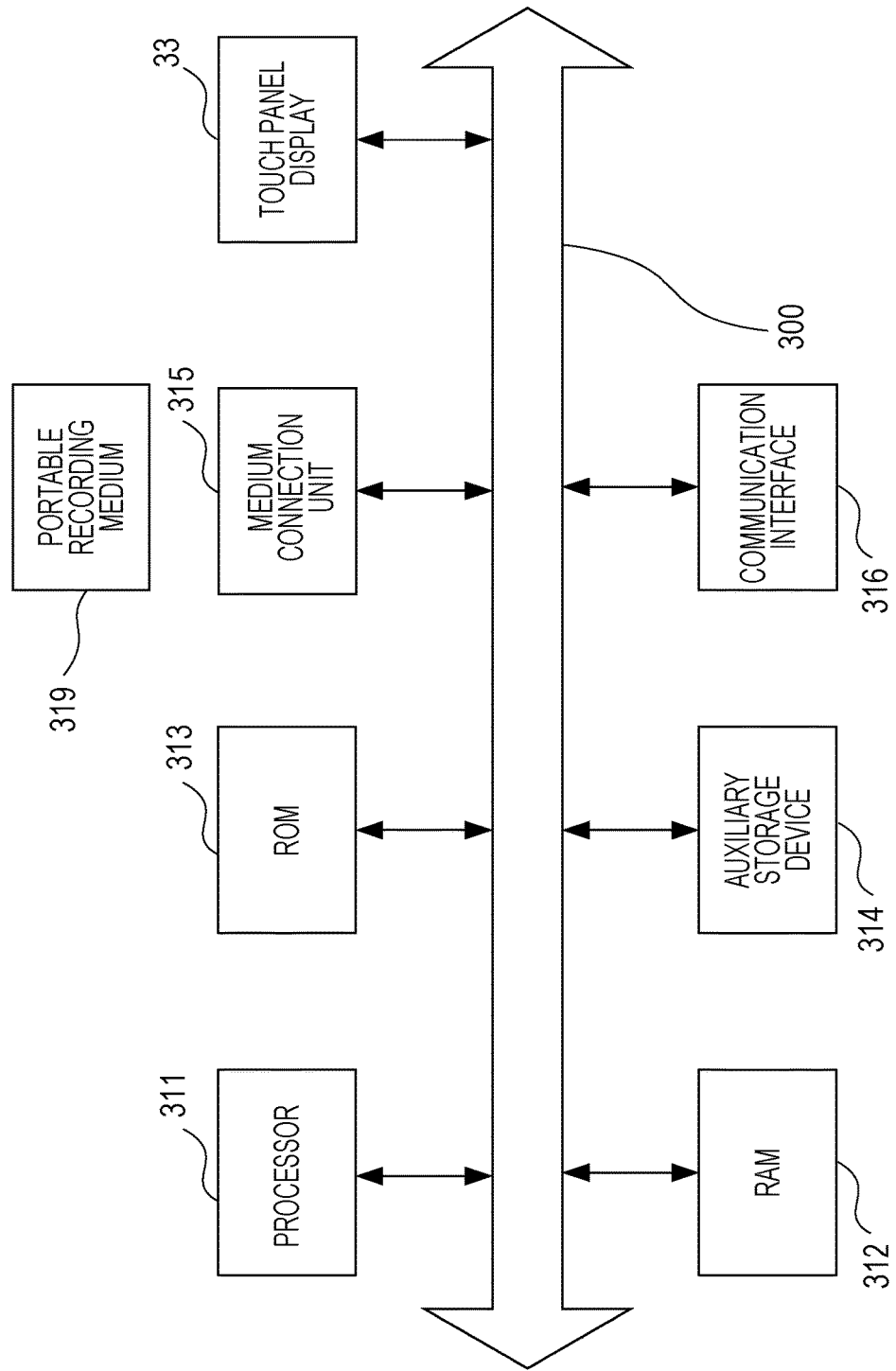
FIG. 24 is a diagram illustrating an example hardware configuration of a printer.

Next, an example hardware configuration of the printer 4 will be described with reference to the example of FIG. 24. As illustrated in the example of FIG. 24, a processor 311, a RAM 312, and a ROM 313 are connected to a bus 300.

In addition, an auxiliary storage device 314, a medium connection unit 315, a communication interface 316, and a touch panel display 33 are connected to the bus 300. The processor 311 executes a program loaded in the RAM 312. As the program to be executed, a program that performs the processing in the embodiment may be applied.

The ROM 313 is a non-volatile storage device that stores programs loaded in the RAM 312. The auxiliary storage device 314 is a storage device that stores various types of information, and for instance, a hard disk or a semiconductor memory or the like may be applied to the auxiliary storage device 314. The medium connection unit 315 is provided so as to connectable to a portable recording medium 319.

As the portable recording medium 319, a portable memory or an optical disc (for instance, a CD or a DVD) may be applied. The portable recording medium 319 may store a program that performs the processing in the embodiment.

The printer storage unit 36 may be implemented by the RAM 312 or the auxiliary storage device 314. The printer communication unit 34 may be implemented by the communication interface 316. The printer control unit 31, the authentication unit 32, and the conversion unit 35 may be each implemented by executing a given program by the processor 311.

The RAM 312, the ROM 313, the auxiliary storage device 314, and the portable recording medium 319 are each an example of a tangible computer-readable storage medium. Each of these tangible storage media is not a transitory medium like a signal carrier wave.

<Others>

As described above, in the embodiments, the server 3 generates intermediate format data or print format data adapted to the regular printer (the first printer) from the intermediate format data received from the terminal 2, and stores the intermediate format data or the print format data. When the output printer is the first printer, the server 3 transmits the stored intermediate format data or print format data to the output printer.

For instance, when the terminal 2 is a thin client terminal, it is difficult to install a printer driver adapted to multiple printers 4 in the terminal 2. In the embodiment, it is sufficient that a printer driver (virtual print driver 13) that prints intermediate format data be installed in the terminal 2, and multiple printer drivers do not have to be installed.

Even if multiple printer drivers are not installed in the terminal 2, the server 3 is capable of causing any printer 4 as a print output destination to perform normal printing. For instance, even when the terminal 2 is not a thin client terminal, similarly, install work of a printer driver may be omitted.

The present embodiment is not limited to the embodiment described above, and various configurations or embodiments may be adopted in a range not departing from the spirit of the present embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A print management apparatus comprising:
   a memory configured to store setting information including user attribute information associated with printer information indicating a printer frequently used by a user; and
   a processor coupled to the memory and the processor configured to:
      receive print data and the user attribute information from a terminal,
      perform a determination of a first printer as an output destination candidate from among a plurality of printers in accordance with the setting information stored in the memory and the received user attribute information,
      perform generation of first print data adapted to the first printer from the print data before an output instruction is received, and
      when the output instruction is received from the first printer, transmit first output data to the first printer in accordance with the first print data, and when the output instruction is received from the second printer, generate second print data adapted to the second printer from the print data after receiving the output instruction, and transmit second output data to the second printer in accordance with the second print data.

2. The print management apparatus according to claim 1, wherein the output destination candidate included in the setting information is determined based on a print output log for the attribute information.

3. The print management apparatus according to claim 2, wherein the print output log is a print output log in a predetermined period determined based on a timing of change of assigned-section information of each of users.

4. The print management apparatus according to claim 1, wherein
   the print data is useable by printers using different Page Description Languages respectively,
   the processor is further configured to determine whether the print data is adapted to the first printer determined as the destination candidate,
   the generation is executed when it is determined that the print data is not adapted to the first printer.

5. The print management apparatus according to claim 1, wherein the first print data and the first output data are same data.

6. The print management apparatus according to claim 1, wherein the first output data is data which is generated by converting the first print data and has a format that allows printing to be performed without converting the format in the first printer.

7. The print management apparatus according to claim 1, the processor further configured to:
   when the output instruction is received from a third printer, determine whether or not the first print data is adapted to the third printer; and
   when the first print data is adapted to the third printer, transmit third output data to the third printer in accordance with the first print data, and when the first print data is not adapted to the third printer, generate third print data adapted to the third printer from the print data, and transmit fourth output data to the third printer in accordance with the third print data.

8. The print management apparatus according to claim 1, wherein
   in the setting information, the user attribute information and the printer information are associated with each other for each day of a week, and
   the determination of the first printer as the output destination candidate is performed based on information of a day of a week.

9. The print management apparatus according to claim 1, wherein the user attribute information includes assigned-section information of a user and the printer information indicating the printer frequently used by the assigned-section.

10. A print management method executed by a computer, the method comprising:
   receiving print data and user attribute information from a terminal;
   performing a determination of a first printer as an output destination candidate from among a plurality of printers in accordance with setting information stored in the memory and the user attribute information, the setting information including the user attribute information associated with printer information indicating a printer frequently used by a user;

performing generation of first print data adapted to the first printer from the print data before an output instruction is received, and when the output instruction is received from the first printer, transmitting first output data to the first printer in accordance with the first print data, and when the output instruction is received from the second printer, generating second print data adapted to the second printer from the print data after receiving the output instruction, and transmitting second output data to the second printer in accordance with the second print data.

11. The print management method according to claim 10, wherein the output destination candidate included in the setting information is determined based on a print output log for the attribute information.

12. The print management method according to claim 11, wherein the print output log is a print output log in a predetermined period determined based on a timing of change of assigned-section information of each of users.

13. The print management method according to claim 10, wherein the print data is useable by printers using different Page Description Languages respectively, the processor is further configured to determine whether the print data is adapted to the first printer determined as the destination candidate, the generation is executed when it is determined that the print data is not adapted to the first printer.

14. The print management method according to claim 10, wherein the first print data and the first output data are same data.

15. The print management method according to claim 10, wherein the first output data is data which is generated by converting the first print data and has a format that allows printing to be performed without converting the format in the first printer.

16. The print management method according to claim 10, further comprising:

when the output instruction is received from a third printer, determining whether or not the first print data is adapted to the third printer; and when the first print data is adapted to the third printer, transmitting third output data to the third printer in accordance with the first print data, and when the first print data is not adapted to the third printer, generating third print data adapted to the third printer from the print data, and transmitting fourth output data to the third printer in accordance with the third print data.

17. The print management method according to claim 10, wherein in the setting information, the user attribute information and the printer information are associated with each other for each day of a week, and the determination of the first printer as the output destination candidate is performed based on information of a day of a week.

18. The print management method according to claim 10, wherein the user attribute information includes assigned-section information of a user and the printer information indicating the printer frequently used by the assigned-section.

19. A non-transitory computer-readable medium storing a print management program that causes a computer to execute a process comprising:

receiving print data and user attribute information from a terminal;

performing a determination of a first printer as an output destination candidate from among a plurality of printers in accordance with setting information stored in the memory and the user attribute information, the setting information including user attribute information associated with printer information indicating a printer frequently used by a user;

performing generation of first print data adapted to the first printer from the print data before an output instruction is received from the first printer, and when the output instruction is received from the first printer, transmitting first output data to the first printer in accordance with the first print data, and when the output instruction is received from the second printer, generating second print data adapted to the second printer from the print data, and transmitting second output data to the second printer in accordance with the second print data.

* * * * *